United States Patent
Pedersen et al.

(10) Patent No.: US 10,383,013 B2
(45) Date of Patent: Aug. 13, 2019

(54) TECHNIQUES FOR RACH (RANDOM ACCESS CHANNEL)-LESS SYNCHRONIZED HANDOVER FOR WIRELESS NETWORKS

(71) Applicant: Nokia Solutions and Networks Oy, Espoo (FI)

(72) Inventors: Klaus Ingemann Pedersen, Aalborg (DK); Frank Frederiksen, Hornbaekvej (DK)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/136,456

(22) Filed: Sep. 20, 2018

(65) Prior Publication Data
US 2019/0021031 A1  Jan. 17, 2019

Related U.S. Application Data

(62) Division of application No. 15/121,174, filed as application No. PCT/EP2014/053952 on Feb. 28, 2014, now abandoned.

(51) Int. Cl.
*H04W 36/00* (2009.01)
*H04W 36/08* (2009.01)
*H04W 56/00* (2009.01)

(52) U.S. Cl.
CPC ... *H04W 36/0094* (2013.01); *H04W 36/0072* (2013.01); *H04W 36/08* (2013.01); *H04W 56/0045* (2013.01)

(58) Field of Classification Search
CPC ............ H04W 56/0045; H04W 36/08; H04W 56/0005; H04W 36/00; H04W 56/004; H04B 7/2678; H04B 7/2684
See application file for complete search history.

(56) References Cited

U.S. PATENT DOCUMENTS 8,369,854 B2* 2/2013 Peisa .................... H04W 36/26
  370/331
8,774,126 B2* 7/2014 Kazmi ............. H04W 56/0005
  310/310

(Continued)

FOREIGN PATENT DOCUMENTS

WO   WO-2014086407 A1   6/2014

OTHER PUBLICATIONS

International Search Report and Written Opinion received for corresponding Patent Cooperation Treaty Application No. PCT/EP2014/053952, dated Feb. 16, 2015, 17 pages.

(Continued)

*Primary Examiner* — Nam T Huynh
(74) *Attorney, Agent, or Firm* — Harrington & Smith

(57) ABSTRACT

An example technique is provided for receiving, by a target base station (BS) from a source PS, information identifying a source cell or the source BS, and a first time advance value used by the user device to transmit signals to the source BS, receiving a signal by the target BS that was transmitted from the user device based on the first tune advance value, determining, by the target BS based upon the first time advance value and the received signal from the user device, a second time advance value to be used by the user device to transmit data to the target BS, sending the second time advance value from the target BS to the source BS, receiving, by the target BS, a handover of the user device from the source BS to the target BS, and receiving data by the target BS from the user device based on the second time advance value.

12 Claims, 16 Drawing Sheets

(56) References Cited

U.S. PATENT DOCUMENTS

| | | | |
|---|---|---|---|
| 9,055,527 B2 * | 6/2015 | Zhang | H04W 56/0035 |
| 2004/0128095 A1 * | 7/2004 | Oestreich | H04B 7/2671 |
| | | | 702/89 |
| 2008/0084849 A1 | 4/2008 | Wang | |
| 2011/0058529 A1 | 3/2011 | Uemura | |

OTHER PUBLICATIONS

"UL Time Synchronized Handover", 3GPP TSG-RAN WG2#58bis, R2-072799, Agenda Item: 4.5.1, Samsung, Jun. 25-29, 2007, pp. 1-5.

* cited by examiner

TECHNIQUES FOR RACH (RANDOM ACCESS CHANNEL)-LESS SYNCHRONIZED HANDOVER FOR WIRELESS NETWORKS

CROSS-REFERENCE TO RELATED APPLICATIONS

This application is a divisional of U.S. patent application Ser. No. 15/121,174, filed Aug. 24, 2016, which is the National Stage of International Application No. PCT/EP2014/053952, filed Feb. 28, 2014.

TECHNICAL FIELD

This description relates to wireless networks.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations, which are referred to as enhanced Node Bs (eNBs), provide wireless access within a coverage area or cell. In LTE, mobile devices, or mobile stations are referred to as user equipments (UE). LTE has included a number of improvements or developments. A mobile station or UE may perform a handover from a source BS to a target BS. In many technologies, a handover may use a random access procedure to allow the MS to obtain a time advance value with respect to the target BS. Also, a handover often causes an interruption in data services for a MS.

SUMMARY

According to an example implementation, a method includes performing a synchronized and random access procedure-less handover including: receiving, by the user device from the source BS, a handover command including at least a handover time field that identifies a time to perform a synchronized handover to the target BS, performing, by the user device without using a random access procedure, a handover from the source BS to the target BS at the time identified by the handover time field, and sending a handover completion message from the user device to the target BS.

In an example implementation, the performing a handover may include the user device: beginning to receive data from the target BS at approximately the time identified by the handover time field, and ceasing to receive data from the source BS at approximately the time identified by the handover time field.

In an example implementation, the method may further include determining, by the user device in an autonomous and a random access procedure-free manner, a time advance value for the user device to transmit data to the target BS.

In an example implementation, the determining the time advance value for the user device to transmit data to the target BS may include: determining, by the user device, a first propagation delay from the source BS to the user device, determining, by the user device, a time difference value as a difference between the first propagation delay and a second propagation delay, the second propagation delay including a propagation delay from a target BS to the user device, determining, by the user device based on the first propagation delay and the time difference value, a second time advance value for use in transmitting signals from the user device to the target BS.

In an example implementation, the method may include receiving, by the user device from the target BS, within an initial scheduling grant from the target BS after handover has been performed to the target BS, a time advance value for the user device to transmit data to the target BS.

In an example implementation, the method may further include receiving, by the user device from the source BS within the handover command, a time advance value for the user device to transmit data to the target BS.

In an example implementation, the method may further include the user device transmitting data to the target BS using a shortened packet or transmission time interval (TTI), including omitting one or more symbols in the shortened packet or TTI based on a coverage area or transmission power of the target BS.

In an example implementation, an apparatus includes at least one processor and at least one memory including computer instructions, when executed by the at least one processor, cause the apparatus to: receive, by the user device from the source BS, a handover command including at least a handover time field that identifies a time to perform a synchronized handover to the target BS, perform, by the user device without using a random access procedure, a handover from the source BS to the target at the time identified by the handover time field, and send a handover completion message from the user device to the target BS.

In an example implementation, a computer program product includes a non-transitory computer-readable storage medium and storing executable code that, when executed by at least one data processing apparatus, is configured to cause the at least one data processing apparatus to perform a method including: receiving, by the user device from the source BS, a handover command including at least a handover time field that identifies a time to perform a synchronized handover to the target BS, performing, by the user device without using a random access procedure, a handover from the source BS to the target BS at the time identified by the handover time field, and sending a handover completion message from the user device to the target BS.

In an example implementation, a method includes determining, by a user device, a first time advance value for the user device for use in transmitting signals from the user device to a source base station (source BS), determining, by the user device, a first propagation delay from a source base station (BS) to the user device, determining, by the user device, a time difference value as a difference between the first propagation delay and a second propagation delay, the second propagation delay including a propagation delay from a target BS to the user device, determining, by the user device based on the first propagation delay and the time difference value, a second time advance value for use in transmitting signals from the user device to the target BS, performing, by the user device, a handover from the source BS to the target BS, and transmitting signals from the user device to the target BS based upon the second time advance value.

In an example implementation, the performing a handover may include performing a synchronized and random access-free handover from the source ES to the target BS in response to a handover command received from the source BS, the synchronized handover being performed by the user device at a time identified in the handover command.

In an example implementation, the performing a handover from the source BS to the target BS may include: sending, from the user device to the source BS, a measurement report indicating a handover to the target BS, receiving, by the user device from the source BS, a handover command including at least a handover time field that identifies a time to perform the handover to the target BS, beginning to receive data from the target ES at a time identified by the handover time field, and sending a handover completion message from the user device to the target BS.

In an example implementation, the determining the second time advance value may include determining the second time advance value based on the following:

TA2=TA1−2*X, wherein TA1 is the first time advance value, TA2 is the second time advance value, and X is the time difference value.

In an example implementation, the determining the time difference value may include the user device performing the following: receiving a first signal from the source BS, receiving a second signal from the target BS, wherein the first signal and the second signal are transmitted at the same time, determining a difference in an arrival time between the first signal and the second signal as received by the user device, wherein the time difference value comprises the difference in arrival time of the first signal and the second signal.

In an example implementation, the determining the time difference value may include the user device performing the following: receiving a first common reference signal(s) (CRS) from the source BS, receiving a second CRS from the target BS, wherein the first CRS and the second CRS are transmitted at the same time, and determining a difference in an arrival time between the first CRS and the second CRS as received by the user device, wherein the time difference value comprises the difference in arrival time of the first CRS and the second CRS.

In an example implementation, an apparatus may include at least one processor and at least one memory including computer instructions, when executed by the at least one processor, cause the apparatus to: determine, by a user device, a first time advance value for the user device for use in transmitting signals from the user device to a source base station (source BS), determine, by the user device, a first propagation delay from a source base station (BS) and the user device, determine, by the user device, a time difference value as a difference between the first propagation delay and a second propagation delay, the second propagation delay including a propagation delay from a target BS and the user device, determine, by the user device based on the first propagation delay and the time difference value, a second time advance value for use in transmitting signals from the user device to the target BS, perform, by the user device, a handover from the source BS to the target BS, and transmit signals from the user device to the target BS based upon the second time advance value.

In an example implementation, a computer program product includes a non-transitory computer-readable storage medium and storing executable code that, when executed by at least one data processing apparatus, is configured to cause the at least one data processing apparatus to perform a method including: determining, by a user device, a first time advance value for the user device for use in transmitting signals from the user device to a source base station (source BS), determining, by the user device, a first propagation delay from a source base station (BS) and the user device, determining, by the user device, a time difference value as a difference between the first propagation delay and a second propagation delay, the second propagation delay including a propagation delay from a target BS and the user device, determining, by the user device based on the first propagation delay and the time difference value, a second time advance value for use in transmitting signals from the user device to the target BS, performing, by the user device, a handover from the source BS to the target BS, and transmitting signals from the user device to the target BS based upon the second time advance value.

In an example implementation, a method may include receiving, by a target base station (BS) from a source BS, information identifying a user device that is connected to the source BS, information identifying a source cell or the source BS, and a first time advance value used by the user device to transmit signals to the source BS, receiving a signal by the target BS that was transmitted from the user device based on the first time advance value, determining, by the target BS based upon the first time advance value and the received signal from the user device, a second time advance value to be used by the user device to transmit data to the target BS, sending the second time advance value from the target BS to the user device, receiving a handover of the user device from the source BS to the target BS, receiving data by the target BS from the user device based on the second time advance value.

In an example implementation, the method may further include receiving by the target BS from the source BS a handover request to perform a handover of the user device from the source BS to the target BS, the handover request including a handover time that identifies a time when a synchronized handover for the user device is to be performed from the source BS to the target BS.

In an example implementation, the method may further include receiving, by the target BS from the source BS, a signal configuration information identifying a configuration of a reference signal transmitted by the user device to the source BS using the first time advance value, receiving, by the target BS from the source BS, and scheduling information identifying scheduled resources for the user device to transmit the reference signal to the source BS, wherein the receiving a signal by the target BS from the user device includes the target BS receiving the scheduled reference signal from the user device.

In an example implementation, the determining may include determining, by the target BS, a second time advance value to be used by the user device to transmit data to the target BS based upon the first time advance value and the reference signal received from the user device via the scheduled resources.

In an example implementation, the reference signal may include a sounding reference signal.

In an example implementation, the receiving a handover may include receiving a synchronized and random access-free handover of the user device from the source BS to the target BS in response, the synchronized handover being performed at a time identified by a handover command.

In an example implementation, a computer program product, the computer program product comprising a non-transitory computer-readable storage medium and storing executable code that, when executed by at least one data processing apparatus, is configured to cause the at least one data processing apparatus to perform a method including: receiving, by a target base station (BS) from a source BS, information identifying a user device that is connected to the source BS, information identifying a source cell or the source BS, and a first time advance value used by the user device to transmit signals to the source BS, receiving a signal by the target BS that was transmitted from the user device based on the first time advance value, determining, by the target BS based upon the first time advance value and the received signal from the user device, a second time advance value to be used by the user device to transmit data to the target BS, sending the second time advance value from the target BS to the user device, receiving a handover of the user device from the source BS to the target BS, and receiving data by the target BS from the user device based on the second time advance value.

In an example implementation, an apparatus includes at least one processor and at least one memory including computer instructions, when executed by the at least one processor, cause the apparatus to: receive, by a target base station (BS) from a source BS, information identifying a user device that is connected to the source BS, information identifying a source cell or the source BS, and a first time advance value used by the user device to transmit signals to the source BS:

receive a signal by the target BS that was transmitted from the user device based on the first time advance value, determine, by the target BS based upon the first time advance value and the received signal from the user device, a second time advance value to be used by the user device to transmit data to the target BS, send the second time advance value from the target BS to the user device, receive a handover of the user device from the source BS to the target BS, and receive data by the target BS from the user device based on the second time advance value.

In an example implementation, a method includes receiving, by a target base station (BS) from a source BS, information identifying a user device that is connected to the source BS, information identifying a source cell or the source BS, and a first time advance value used by the user device to transmit signals to the source BS, receiving a signal by the target BS that was transmitted from the user device based on the first time advance value, determining, by the target BS based upon the first time advance value and the received signal from the user device, a second time advance value to be used by the user device to transmit data to the target ES, sending the second time advance value from the target BS to the source BS, receiving, by the target BS, a handover of the user device from the source BS to the target BS, and receiving data by the target BS from the user device based on the second time advance value.

In an example implementation, the source BS sends the second time advance value to the user device, In an example implementation, the method may further include the source BS sending a handover command to the user device, the handover command identifying a synchronized and random access procedure-free handover to the target BS, a time to perform the handover, and the second time advance value.

In an example implementation, the method may further include receiving by the target BS from the source BS a handover request to perform a handover of the user device from the source BS to the target ES, the handover request including a handover time that identifies a time when a synchronized handover for the user device is to be performed from the source BS to the target ES, and sending, by the target BS to the source BS, a handover request acknowledgement that acknowledges that a synchronized handover will be performed for the user device from the source BS to the target ES at the identified time.

In an example implementation, the method may further include receiving, by the target BS from the source BS, a signal configuration information identifying a configuration of a reference signal transmitted by the user device to the source BS using the first time advance value, receiving, by the target BS from the source BS, scheduling information identifying scheduled resources for the user device to transmit the reference signal to the source BS, wherein the receiving a signal by the target BS from the user device includes the target BS receiving the scheduled reference signal from the user device.

In an example implementation, the determining may include determining, by the target BS, a second time advance value to be used by the user device to transmit data to the target BS based upon the first time advance value and the reference signal received from the user device via the scheduled resources.

In an example implementation, the reference signal may include a sounding reference signal.

In an example implementation, the receiving a handover may include receiving a synchronized and random access-free handover of the user device from the source BS to the target BS, the synchronized handover being performed at a time identified by a handover command.

In an example implementation, a computer program product may include a non-transitory computer-readable storage medium and storing executable code that, when executed by at least one data processing apparatus, is configured to cause the at least one data processing apparatus to perform a method including: receiving, by a target base station (BS) from a source BS, information identifying a user device that is connected to the source BS, information identifying a source cell or the source BS, and a first time advance value used by the user device to transmit signals to the source BS, receiving a signal by the target BS that was transmitted from the user device based on the first time advance value, determining, by the target BS based upon the first time advance value and the received signal from the user device, a second time advance value to be used by the user device to transmit data to the target BS, sending the second time advance value from the target BS to the source BS, receiving, by the target BS, a handover of the user device from the source BS to the target BS, and receiving data by the target BS from the user device based on the second time advance value.

In an example implementation, an apparatus may include at least one processor and at least one memory including computer instructions, when executed by the at least one processor, cause the apparatus to: receive, by a target base station (BS) from a source BS, information identifying a user device that is connected to the source BS, information identifying a source cell or the source BS, and a first time advance value used by the user device to transmit signals to the source BS, receive a signal by the target BS that was transmitted from the user device based on the first time advance value, determine, by the target BS based upon the first time advance value and the received signal from the user device, a second time advance value to be used by the user device to transmit data to the target BS, send the second time advance value from the target BS to the source BS, receiving, by the target BS, a handover of the user device from the source BS to the target BS, and receive data by the target BS from the user device based on the second time advance value.

In an example implementation, a method may include determining, by a source base station (BS), a first time advance value for the user device to use in transmitting signals from the user device to source BS, sending, from the source BS to the user device a request to measure a target BS propagation delay of a signal transmitted from a target BS to the user device, receiving the target BS propagation delay from the user device, determining, by the source BS, a second time advance value for the user device to use in transmitting signals to the target BS, and sending a handover command to the user device, the handover command including the second time advance value.

In an example implementation, the determining, by the source BS, the second time advance value for the user device may include determining, by the source BS based on the first time advance value and the target BS propagation delay, the second time advance value for the user device to use in transmitting signals to the target BS.

In an example implementation, the determining, by the source BS, the second time advance value for the user device may include determining, by the source BS based on the following: TA2=TA1−2*(T2−T1), where T1 is a source BS propagation delay of a signal transmitted from the source BS to the user device, T2 is the target BS it propagation delay, TA1 is the first time advance value for the user device, and TA2 is the second time advance value for the user device.

In an example implementation, the method further includes performing a synchronized and random access procedure-free handover of the user device from the source BS to the target BS based on the handover command, the handover of the user device being performed at a time identified in the handover command.

In an example implementation, the method may further include performing a handover of the user device from the source BS to the target BS, including: receiving, by the source BS from the user device, a measurement report indicating a handover to the target BS, and sending, by the source ES to the user device, a handover command including at least a handover time field that identifies a time to perform a random access procedure-free and synchronized handover to the target BS.

In an example implementation, a computer program product includes a non-transitory computer-readable storage medium and storing executable code that, when executed by at least one data processing apparatus, is configured to cause the at least one data processing apparatus to perform a method including: determining, by a source base station (BS), a first time advance value for the user device to use in transmitting signals from the user device to source BS, sending, from the source BS to the user device a request to measure a target BS propagation delay of a signal transmitted from a target BS to the user device, receiving the target BS propagation delay from the user device, determining, by the source BS, a second time advance value for the user device to use in transmitting signals to the target BS, and sending a handover command to the user device, the handover command including the second time advance value.

In an example implementation, an apparatus includes at least one processor and at least one memory including computer instructions, when executed by the at least one processor, cause the apparatus to: determine, by a source base station (BS), a first time advance value for the user device to use in transmitting signals from the user device to source BS, send, from the source BS to the user device a request to measure a target BS propagation delay of a signal transmitted from a target BS to the user device, receive the target BS propagation delay from the user device, determine, by the source BS, a second time advance value for the user device to use in transmitting signals to the target BS, and send a handover command to the user device, the handover command including the second time advance value.

In an example implementation, a method includes sending, from a source base station (BS) to a target BS, a request for expected coverage range or transmission power level for a cell associated with the target BS, receiving, by the source BS from the target BS, the expected coverage range or transmission power level of the cell associated with the target BS, sending the expected coverage range or transmission power level of the cell associated with the target BS from the source BS to a user device, sending a handover command to the user device to cause a handover for the user device from the source ES to the target BS, wherein the user device omits one or more symbols from one or more packets transmitted by the user device to the target BS based on the expected coverage range or transmission power level of the target BS.

In an example implementation, the user device omitting may include the user device omitting a first number of symbols of one or more packets if the expected coverage range or transmission power is above a first threshold and less than a second threshold, and the user device omitting a second number of symbols of one or more packets if the expected cover range or transmission power is greater than the second threshold, wherein the second number is greater than the first number.

In an example implementation, the user device omitting may include the user device: omitting three symbols of one or more packets if the expected coverage range or transmission power indicates a macro cell or large cell, omitting two symbols of one or more packets if the expected coverage range or transmission power indicates a micro cell or medium cell, where the micro cell is smaller than the macro cell, and omitting one symbol of one or more packets if the expected coverage range or transmission power indicates a pico cell or small cell, where the pico cell is smaller than the micro cell.

In an example implementation, a computer program product includes a non-transitory computer-readable storage medium and storing executable code that, when executed by at least one data processing apparatus, is configured to cause the at least one data processing apparatus to perform a method including: sending, from a source base station (BS) to a target BS, a request for expected coverage range or transmission power level for a cell associated with the target BS, receiving, by the source BS from the target BS, the expected coverage range or transmission power level of the cell associated with the target BS, sending the expected coverage range or transmission power level of the cell associated with the target BS from the source BS to a user device, sending a handover command to the user device to cause a handover for the user device from the source BS to the target BS, wherein the user device omits one or more symbols from one or more packets transmitted by the user device to the target BS based on the expected coverage range or transmission power level of the target BS.

In an example implementation, an apparatus includes at least one processor and at least one memory including computer instructions, when executed by the at least one processor, cause the apparatus to: send, from a source base station (BS) to a target BS, a request for expected coverage range or transmission power level for a cell associated with the target BS, receive, by the source BS from the target BS, the expected coverage range or transmission power level of the cell associated with the target BS. send the expected coverage range or transmission power level of the cell associated with the target BS from the source BS to a user device, sending a handover command to the user device to cause a handover for the user device from the source BS to the target BS, wherein the user device omits one or more symbols from one or more packets transmitted by the user device to the target BS based on the expected coverage range or transmission power level of the target BS.

The details of one or more implementations are set forth in the accompanying drawings and the description below. Other features will be apparent from the description and drawings, and from the claims.

DETAILED DESCRIPTION

Figure 1:
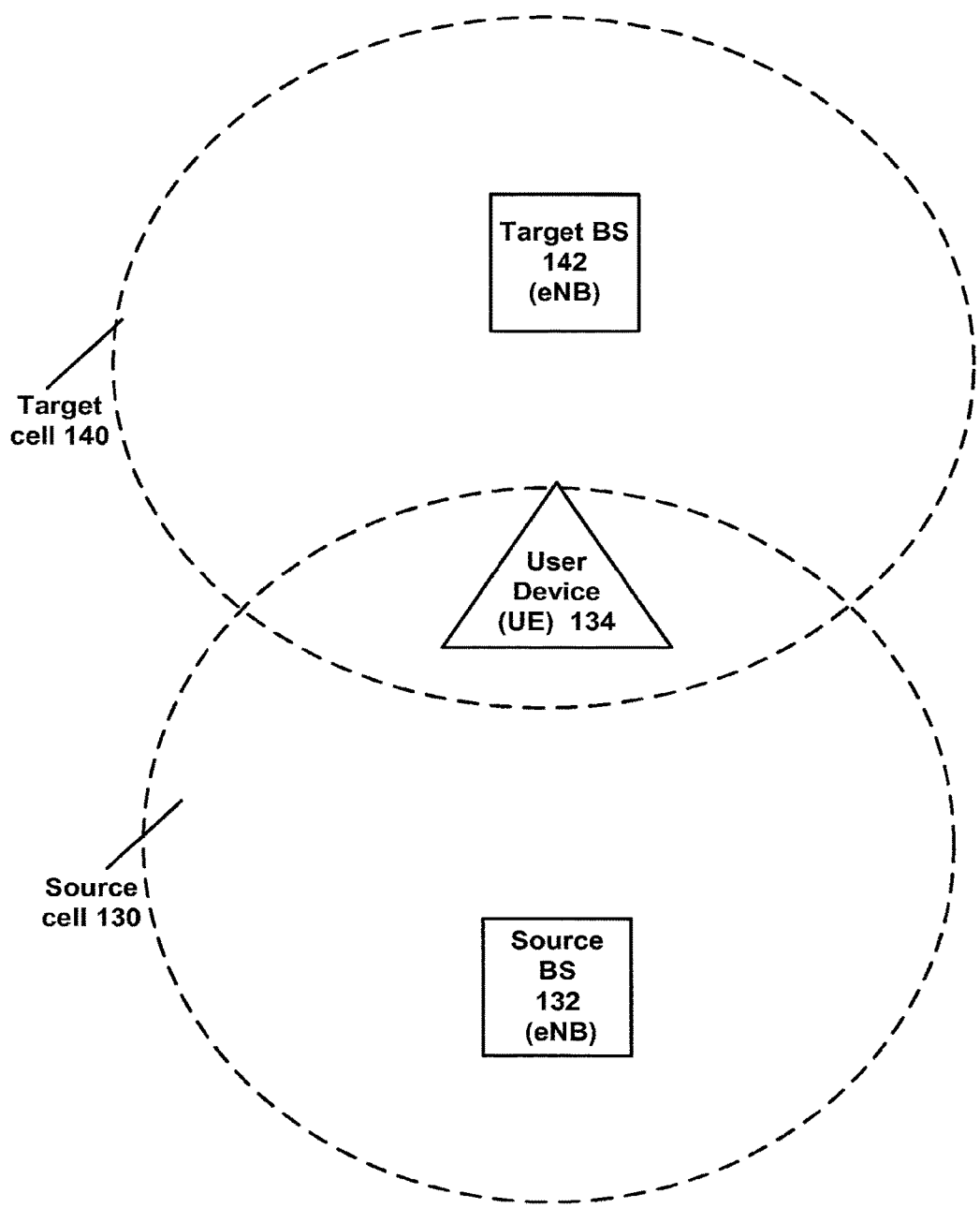
FIG. 1 is a block diagram illustrating a handover of a user device from a source base station (BS) to a target BS according to an example implementation.

FIG. 1 is a block diagram illustrating a handover of a user device from a source base station (BS) to a target BS according to an example implementation. A source BS 132 may provide wireless services within source cell 130 to one or more wireless user devices. A target BS 142 may provide wireless services within a target cell 140 to one or more wireless user devices. Multiple user devices or user equipments (UEs), including user device 134, may be connected (and in communication) with BS 132, for example. BSs may also be referred to as enhanced Node Bs (eNBs) in the case where the radio access technology (RAT) is LTE, but may have other names for other RATs. A plurality of user devices (not shown) may be connected to and in communication with target BS 142. While only one user device is shown (user device 134), multiple user devices may be connected (and in communication) with each BS.

According to an example implementation, at least part of the functionalities of a base station (BS) or (e)Node B may be also be carried out by any node, server or host which may be operably coupled to a transceiver, such as a remote radio head. Although not shown, each of the BSs may be connected together via one or more communication links, such as a wired link or a wireless communications link. One example of such communication link could be the X2 interface. Also, one or more of the BSs may also be connected to a core network, e.g., via a S1 interface or other interface. This is merely one simple example of a wireless network, and others may be used. In one example implementation, source BS 132 and target BS 142 may have the same time synchronization, e.g., having or using a same clock for synchronization. In another example implementation, both source BS 132 and target BS 142 may be synchronized based on a same clock, but an offset in timing may exist between the source BS and target BS, as examples.

A user device (user terminal, user equipment (UE)) may refer to a stationary (e.g., non-portable) computing device or a portable computing device that includes wireless mobile communication devices operating with or without a subscriber identification module (SIM), including, but not limited to, the following types of devices: a mobile station, a mobile phone, a cell phone, a smartphone, a personal digital assistant (PDA), a handset, a device using a wireless modem (alarm or measurement device, a patient medical monitoring device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network. A user device may also include downlink-only devices, or devices that primarily receive downlink communications, such as a pager.

User device 132 may initially be connected to source BS 132. Eventually, e.g., based on movement of user device 134 towards BS 142, BS 142 may become a better serving BS than BS 132, e.g., based on a greater signal strength from BS 142 as compared to BS 132, as measured by user device 134. Based on the measurement of signals transmitted by multiple BSs (including signals transmitted by BS 132 and BS 142), user device 134 may send a measurement report to source BS 132, indicating a handover (HO) to the target BS 142 (e.g., based on signal strength). This may cause a handover procedure to be performed to handover the user device 134 from the source BS 132 to the target BS 142. The handover procedure may typically involve the user device 134 performing a random access procedure with the target BS to obtain a time advance value.

Figure 2:
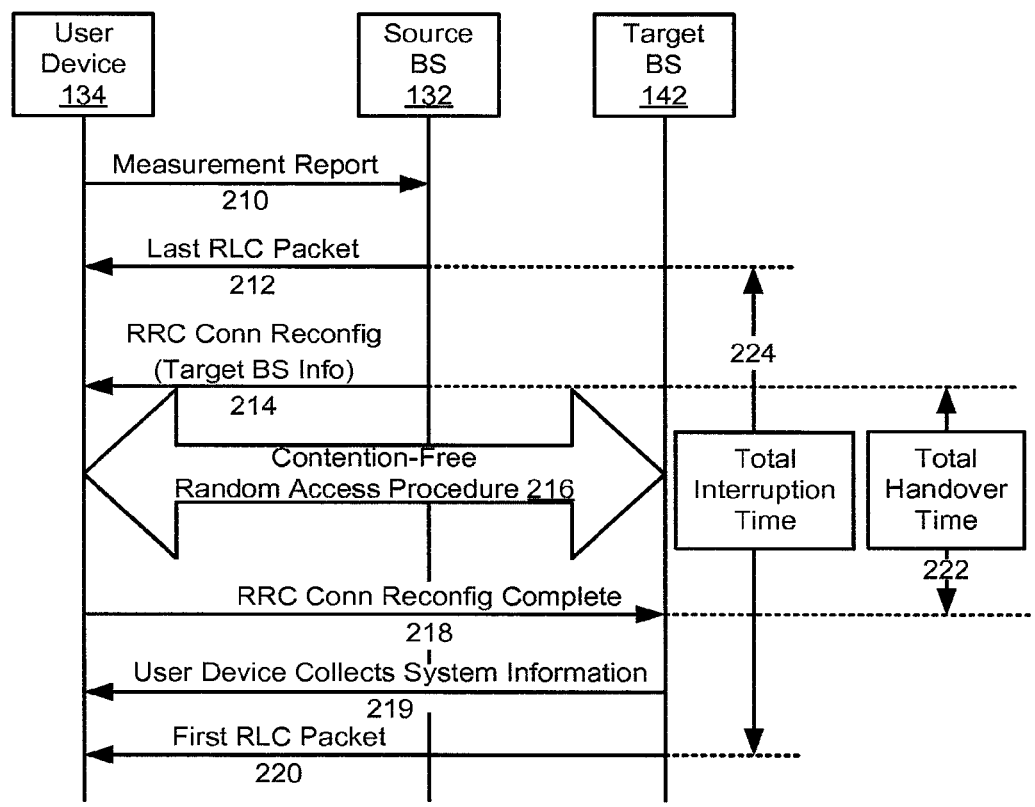
FIG. 2 is a timing diagram that illustrates an example unsynchronized handover where a user device uses a random access procedure to obtain a time advance value.

FIG. 2 is a diagram that illustrates an example unsynchronized handover where a user device uses a random access procedure to obtain a time advance value. A handover of user device 134 from a source BS 132 to a target BS 142 may, for example, be triggered by a measurement report at 210 sent from user device 134 to source BS 132 indicating handover to target BS 142. For example, a RRC (Radio Resource Control) measurement report may be triggered to be sent when one of several conditions has occurred (or one of several signal conditions has been detected by the user device/UE), such as, for example: 1) a signal received from a neighbor BS has a greater received signal strength than a signal received from the serving cell/source BS (e.g., indicating that better performance may be obtained by the user device performing a handover and connecting to the neighbor cell/BS); or, 2) a signal from a primary/serving cell (or source BS) becomes worse (e.g., a received signal strength as measured by user device is less) than a defined threshold, and a signal from a neighbor cell becomes some offset better (e.g., signal strength is greater) than a signal from the primary/serving cell. These are merely some examples, and other signal conditions may be used to trigger or cause the user device or UE to transmit a RRC measurement report to a serving cell/source BS, for example. In an example implementation, a measurement report may indicate a handover to a target BS when, for example, the measurement report indicates that a received signal strength from the target BS (as measured by the user device) is an offset better than the received signal strength of the serving cell/source BS. This is merely an example.

After a last transmission of a packet at 212 from source BS 132 to user device 134, the source BS 132 may send a handover command, such as a Radio Resource Connection (RRC) Connection Reconfiguration at 214, to user device 134, indicating handover to target BS 142, including information for target BS 142. The handover command or RRC Connection Reconfiguration may include a random access preamble. Next, the user device 134 and the target BS 132 may perform a random access procedure via a random access channel (RACH), including the user device 134 (or UE) sending a random access request including the random access preamble via the RACH to the target BS 142. The target BS 142 may determine a time advance value for the user device 134 based on the propagation delay of the transmitted preamble. The target BS 142 may send a random access response to the user device 134 that includes the advance value that may be used by the user device 134 to adjust the timing of its transmission to the target BS so the user device 134 may transmit uplink to the target BS 142 in a synchronized manner. After the random access procedure at 216, the user device 134 may send a RRC Connection Reconfiguration complete (or handover complete message) to the target BS 142. And, the user device 134 may receive system information from the target BS 142 at 219, and may receive data packets from the target BS at 220. Thus, in this example, the handover of the user device 134 may be considered unsynchronized because a significant delay exists between a time (at 212) the user device 134 stops receiving data from the source BS 132 and a time (at 220) the user device 134 starts receiving data from the target BS 142. Therefore, in this example shown in FIG. 2 of an unsynchronized handover, the total interruption time 224 (including handover time 222) may be significant, e.g., which may include a delay from a last data transmission from the source BS 132 at 212 until a first data transmission from the target BS to the user device 134 at 220, for example.

Therefore, based on the example handover shown in FIG. 2, in some cases, a handover procedure may involve both an interruption time (224) with no data connectivity for the user device 134 as well as overhead from the random access procedure with the target BS 142/target cell 140. According to an example implementation, various example implementations are described to perform a random access procedure-less (or RACH-less) and time-synchronized (or simply synchronized) handover for a user device from a source BS 132 to a target BS 142, e.g., in order to reduce overhead and decrease the interruption time 224 for the user device.

A random access procedure-less handover may be or may include a handover where the user device does not acquire a time advance value via a random access procedure (e.g., no random access procedure is used). In several different example implementations, the user device 134 may acquire a time advance value for the target BS 142 via another technique (e.g., without using a random access procedure). A synchronized handover may include a handover for a user device where the user device may begin receiving data within X ms of the user device receiving a last data from the source BS 132 prior to handover, where X is a smaller number than provided by use of a random access procedure. For example, the total interruption time 224 may be, 50-150 ms, and may be on the order of 100 ms, as an example. For an example of a synchronized handover, the user device may begin receiving data from the target BS 142 at approximately the same time as the user device 134 last receives data from the source BS 132, where approximately may mean, for example, that the interruption delay 224 for a synchronized handover may be, for example, less than 2 ms, less than 5 ms, or less than 10 ms, as examples.

Figure 3:
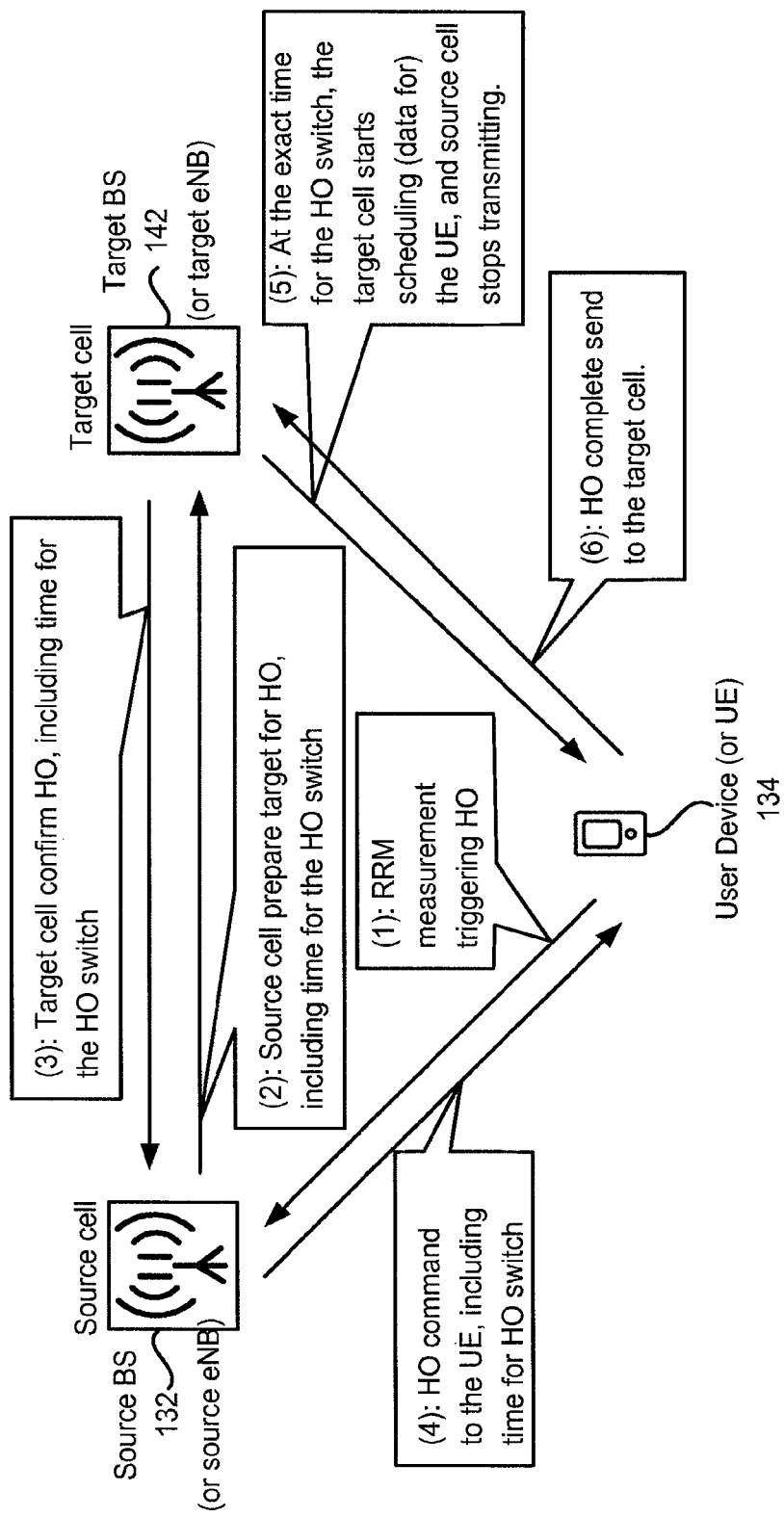
FIG. 3 is a diagram illustrating an example of a general synchronized RACH-less (or random access procedure-less) handover procedure according to an example implementation.

FIG. 3 is a diagram illustrating an example of a general synchronized RACH-less (or random access procedure-less) handover procedure according to an example implementation. At operation 1) of FIG. 3, the user device measures signals transmitted by various BSs, including signals transmitted by source BS 132 and target BS 142, such as, for example, measuring common reference signals (CRS) signals. The user device 134 may determine that target BS 142 provides greater signal strength as compared to source BS 132. Therefore, at operation 1), user device 134 may send a radio resource measurement report to source BS 132 indicating handover to target BS 142. This measurement reports triggers a handover of the user device 134 to target BS 142.

At operation 2) of FIG. 3, assuming that the source cell or source BS 142 decides to initiate handover, the source BS 132 informs the target cell or target BS 142 of the requested handover via the X2 interface, including informing the target cell of the time when the handover will be performed. For example, source BS 132 may send a handover request to target BS 142, identifying a time for synchronized handover for user device 134 from source BS 132 to target BS 142.

At operation 3) of FIG. 3, the target BS 142 confirms the handover to the source BS 132, including the handover time. For example, target BS 142 may send a handover request acknowledgement to source BS 132 to confirm handover of the user device 134 to target BS 142 at the identified/requested handover time. If the handover time proposed by the source BS 132 is unacceptable to the target BS 142, then target BS 142 may send a handover request acknowledgement which includes a new proposed time for synchronized handover. Note that operations 2) and 3) of FIG. 3 may be repeated, as necessary, so that source BS 132 and target BS 142 may negotiate and/or agree on a time for the synchronized handover.

At operation 4) of FIG. 3, the source BS 132 sends a handover command (e.g., a RRC connection reconfiguration) to the user device 134, informing the user device 134 of the time (e.g., exact time-instant) where it should perform the handover from source cell/source BS 132 to the target cell/target BS 132. The handover command may include, for example, a field indicating handover, information identifying the target BS 142 or target cell (e.g., BSID or cell ID), information (e.g., user device ID or cell radio network temporary identifier/C-RNTI for the user device or UE) identifying the user device 134 to which the handover command is directed, and the time for the synchronized handover. The time for handover may be indicated in seconds, by frame number, or other values or quantities that may indicate a specific time for a handover. In an example implementation, this identified time for handover may be the time which the user device 134 stops receiving or listening to transmissions from the source cell/source BS 132 and starts receiving or listening to transmissions from the target cell/target BS 142 stops transmitting data to the user device 134 on or before the handover time.

At operation 5), at the time for handover indicated in the handover command, the target cell/target BS 142 schedules DL data for transmission to the user device 134 (e.g., user device 134 may begin receiving data from the target BS 142 at or approximately the time for handover, for example), and the source cell/source BS 132 stops transmitting data to the user device 134 at (or possibly before) this handover time. At operation 6) of FIG. 3, the user device 134 sends a handover complete message (e.g., RRC connection reconfiguration complete) to the target cell/target BS 142 to indicate that the handover to the target cell/target BS 142 is completed.

Figure 4:
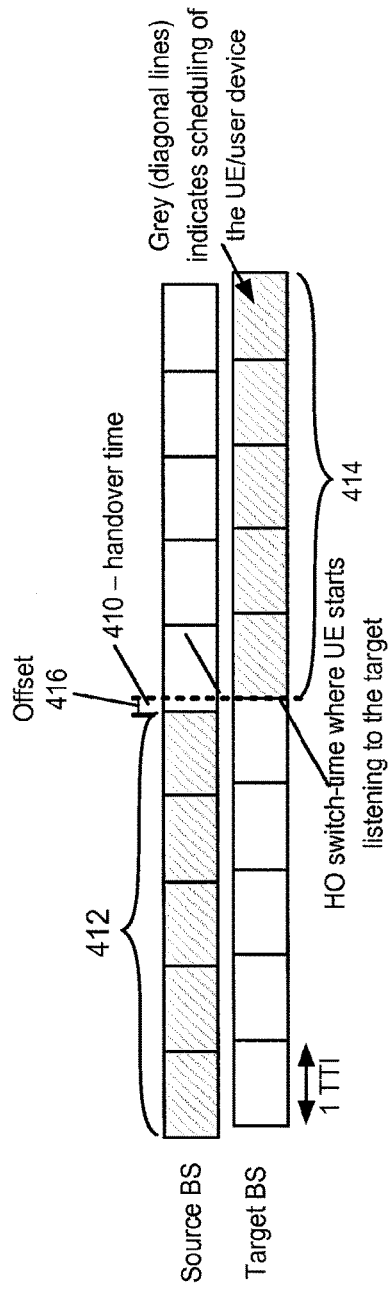
FIG. 4 is a diagram illustrating downlink data scheduling from a source BS and a target BS before and after a handover time 410 according to an example implementation.

FIG. 4 is a diagram illustrating downlink data scheduling from a source BS and a target BS before and after a handover time 410 according to an example implementation. Scheduled downlink data 412 (shown in grey) from the source BS 132 shown in a top row, and scheduled downlink data 414 (shown in grey) from the target BS 142 is shown in a bottom row. The data is divided into transmission packets, where, for example, each packet may include one or more transmission time intervals or TTIs. A handover time 410 is shown between TTIs (and could also be shown between packets or frames). In this example implementation, the source BS 132 has scheduled transmission of data or transmits data to the user device 134 at downlink data 412 before the handover time 410 (also referred to as handover switch time). While target BS 142 transmits data (or has scheduled the transmission of data) to user device 134 at downlink data 414 after the handover time 410. Thus, the user device 134 may listen to (e.g., receive and decode) data 412 before the handover time 410, and may listen to (e.g., receive and decode) data 414 from the target BS after handover time 410. Although the transmission from the source BS 132 and target BS 142 are time synchronized, there might be a minor offset 416 in the timing of the source cell/source BS 132 and target cell/target BS 142. Based on this offset 416 in timing between source BS 132 and target BS 142, there may be an interruption time period (e.g., corresponding to offset 416) that may be a fraction or portion of a TTI or a portion or fraction of a packet, for example.

Figure 5:
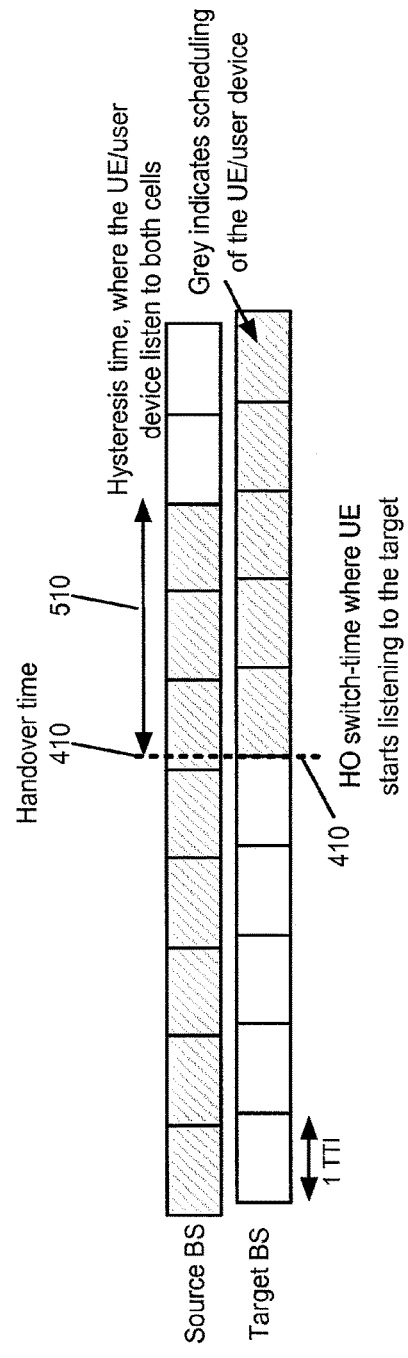
FIG. 5 is a diagram illustrating downlink data scheduling from a source BS and a target BS before and after a handover time 410, including a hysteresis time 510, according to an example implementation.

FIG. 5 is a diagram illustrating downlink data scheduling from a source BS and a target BS before and after a handover time 410, including a hysteresis time 510, according to an example implementation. In the example implementation shown in FIG. 5, there is a period of time (hysteresis time 510) where the user device or UE may listen to (or receive and decode) signals from both source BS 132 and target BS 142. The advantage of this example implementation, is that the source BS 132 will be more likely (higher probability) to transmit any pending Hybrid ARQ (HARQ) packet retransmissions (e.g., data that was not acknowledged as being received) to the user device 134 (and other user devices) during such hysteresis time 510. Both the source BS 132 and the target BS 142 will know or receive the hysteresis time 510 (the length of the hysteresis time 510). The length of the hysteresis time 510 may be fixed, or may be negotiated between source BS and target BS within operations 2), 3) and 4) of FIG. 3. The cost for this hysteresis time may include slightly more complexity at the source BS and target BS and the user device, and usage of slightly more resources during the hysteresis time 510.

As noted above with respect to FIG. 3, a RACH-less (random access procedure-less) handover may be performed. A number of different example implementations are described below for RACH-less techniques to either calculate a time advance value (without use of random access procedure) for a user device 134 with respect to a target BS 142 or to temporarily reduce a length of an uplink transmission packet to a target BS when a time advance value is unavailable, in order to stay within a transmission time interval for a packet or frame or other chunk of data.

A first example implementation may include a user device performing an autonomous calculation of a target cell/target BS time advance value (TA).

When calculating the time advance value towards the target cell, the user device or UE may use the assumption that the network is synchronized and operate according to the following assumptions and calculations, as an example:

Propagation delay from source cell/source BS 132 to user device 134=T1;

Propagation delay from target cell/target BS 142 to user device =T2;

Current time advance value towards source cell/source BS 132=TA1=2*T1. In other words, a time advance value for a user device or UE may be set to twice the propagation delay with respect to such BS. Thus, both TA1 and T1 are known by user device. Also, the user device 134 is able to measure a time difference in signals received from the source cell/source BS 132 and the target cell/target BS 142, since the user device 134 is capable of measuring radio link measurements.

The user device 134 will measure a time difference value: X=T1−T2. For example, the user device 134 may measure a time difference of common reference signals (CRS) transmitted by the source BS 132 and target BS 142. The CRS signals may typically be transmitted at the same time, based on BSs being synchronized, for example.

Time advance value towards the target cell would be: TA2=2*T2.

Following this, the time advance value towards the target cell may be calculated based on the following, for example:

$$TA2=2*(T1-X)=TA1-2*X.$$

Therefore, according to an example implementation, a user device may calculate or determine a time advance value towards (or with respect to) source BS 142 based on the following method or technique: Determining, by a user device, a first time advance value (TA1) for the user device for use in transmitting signals from the user device to a source BS. Determining, by the user device, a first propagation delay (T1) from the source BS and the user device (e.g., T1=TA1/2). Determining, by the user device, a time difference value (X) as a difference between the first propagation delay (T1) and a second propagation delay (T2), the second propagation delay including a propagation delay from a target BS to the user device. Determining, by the user device based on the first propagation delay (T1) and the time difference value (X), a second time advance value (TA2) for use in transmitting signals from the user device to the target BS. For example, TA2 may be determined or calculated as TA2=2*(T1−X)=TA1−2*X. Performing, by the user device, a handover from the source BS to the target B. And, transmitting signals from the user device to the target BS based upon the second time advance value (TA2).

In an example implementation, the performing the handover may include performing a synchronized and random access-free handover from the source BS to the target BS in response to a handover command received from the source BS, the synchronized handover being performed by the user device at a time identified in the handover command.

In an example implementation, the performing a handover from the source BS to the target BS may include: sending, from the user device to the source BS, a measurement report indicating a handover to the target BS; receiving, by the user device from the source BS, a handover command including at least a handover time field that identifies a time to perform the handover to the target BS; beginning to receive data from the target BS at a time identified by the handover time field; and sending a handover completion message from the user device to the target BS.

In an example implementation, the determining the second time advance value (TA2) may include determining the second time advance value based on the following: TA2=TA1 −2*X, wherein TA1 is the first time advance value, TA2 is the second time advance value, and X is the time difference value.

In an example implementation, the determining the time difference value (X) may include the user device performing the following: receiving a first signal from the source BS; receiving a second signal from the target BS, wherein the first signal and the second signal are transmitted at the same time; and determining a difference in an arrival time between the first signal and the second signal as received by the user device, wherein the time difference value includes the difference in arrival time of the first signal and the second signal.

In an example implementation, the determining the time difference value includes the user device performing the following: receiving a first common reference signal(s) (CRS) from the source BS; receiving a second CRS from the target BS, wherein the first CRS and the second CRS are transmitted at the same time; and determining a difference in an arrival time between the first CRS and the second CRS as received by the user device, wherein the time difference value includes the difference in arrival time of the first CRS and the second CRS.

Figure 6:
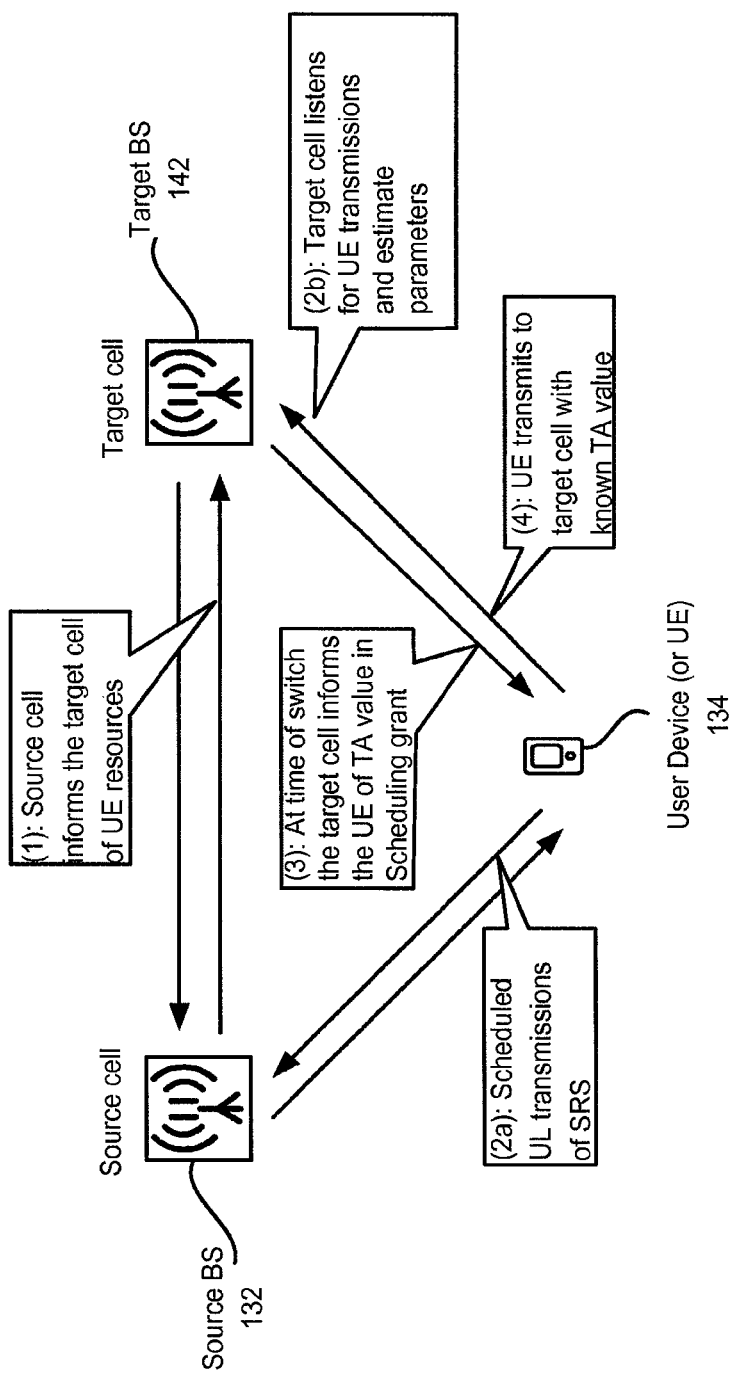
FIG. 6 is a diagram illustrating a second example implementation in which a target BS estimates a time advance value for a user device with respect to the target BS.

FIG. 6 is a diagram illustrating a second example implementation in which a target BS estimates a time advance value for a user device with respect to the target BS. According to a second example implementation illustrated in FIG. 6, a passive scheme is provided where: At operation 1, the source cell source BS 132 informs the target cell/target BS 142 about the configuration of the handover candidate (e.g., configuration of the user device 134), such as the information identifying the user device 134 (e.g., MSID or C-RNTI), source cell ID or source BS ID, SRS (sounding reference signal) configuration that identifies a configuration of the SRS signals transmitted by the user device 134, a current time advance value (e.g., TA1) used by the user device 134 when transmitting to the source BS 132, and potentially also scheduling information (e.g., uplink resources scheduled by source BS 132 to allow the user device 134 to transmit data or SRS signals to the source BS 132). At operation 2A, the user device 134 may transmit signals (e.g., SRS signals) via the scheduled resources. By knowing this information, at operation 2B, at the target cell/target BS 142 is able to measure the uplink (UL) signals (e.g., SRS signals) transmitted from the user device 134/UE at operation 2A in FIG. 6, and hence estimate a timing advance (TA2) for the user device with respect to the target cell/target BS 142. Following, at operation 3), at the time of the handover, the target BS 142 informs the user device 134 of the time advance value (TA2). For example, the target cell/target BS 142 may send the time advance value (TA2) for the target BS 142 to the user device 134/UE in one of the first downlink (DL) transmissions after the user device starts to listen (e.g., receive and decode) to signals from the target cell/target BS 142. For example, the time advance value (e.g., TA2) with respect to the target BS 142 may be sent by target BS 142 to user device 134 via a scheduling grant sent to the user device 134. At operation 4) of FIG. 6, the user device may transmit data to the target BS based (e.g., by advancing the start of transmission by TA2) on the time advance value (TA2).

According to an example implementation, a target BS may determine a time advance value for a user device with respect to the target BS based on the following: Receiving, by a target base station (BS) from a source BS, information identifying a user device that is connected to the source BS, information identifying a source cell or the source BS, and a first time advance value used by the user device to transmit signals to the source BS; receiving a signal (e.g., SRS signals) by the target BS that was transmitted from the user device based on the first time advance value; determining, by the target BS based upon the first time advance value and the received signal from the user device, a second Lime advance value to be used by the user device to transmit data to the target BS; sending the second time advance value from the target BS to the user device; receiving a handover of the user device from the source BS to the target BS; and receiving data by the target BS from the user device based on the second time advance value.

The technique may further include receiving by the target BS from the source BS a handover request to perform a handover of the user device from the source BS to the target BS, the handover request including a handover time that identifies a time when a synchronized handover for the user device is to be performed from the source BS to the target BS.

The example technique may further include receiving, by the target BS from the source BS, a signal configuration information identifying a configuration of a reference signal transmitted by the user device to the source BS using the first time advance value; receiving, by the target BS from the source BS, scheduling information identifying scheduled resources for the user device to transmit the reference signal to the source BS; and, wherein the receiving a signal by the target BS from the user device includes the target BS receiving the scheduled reference signal from the user device.

In an example implementation, the determining may include determining, by the target BS, a second time advance value to be used by the user device to transmit data to the target BS based upon the first time advance value and the reference signal received from the user device via the scheduled resources.

In an example implementation, the receiving a handover may include receiving a synchronized and random access-free handover of the user device from the source BS to the target BS, the synchronized handover being performed at a time identified by a handover command.

Figure 7:
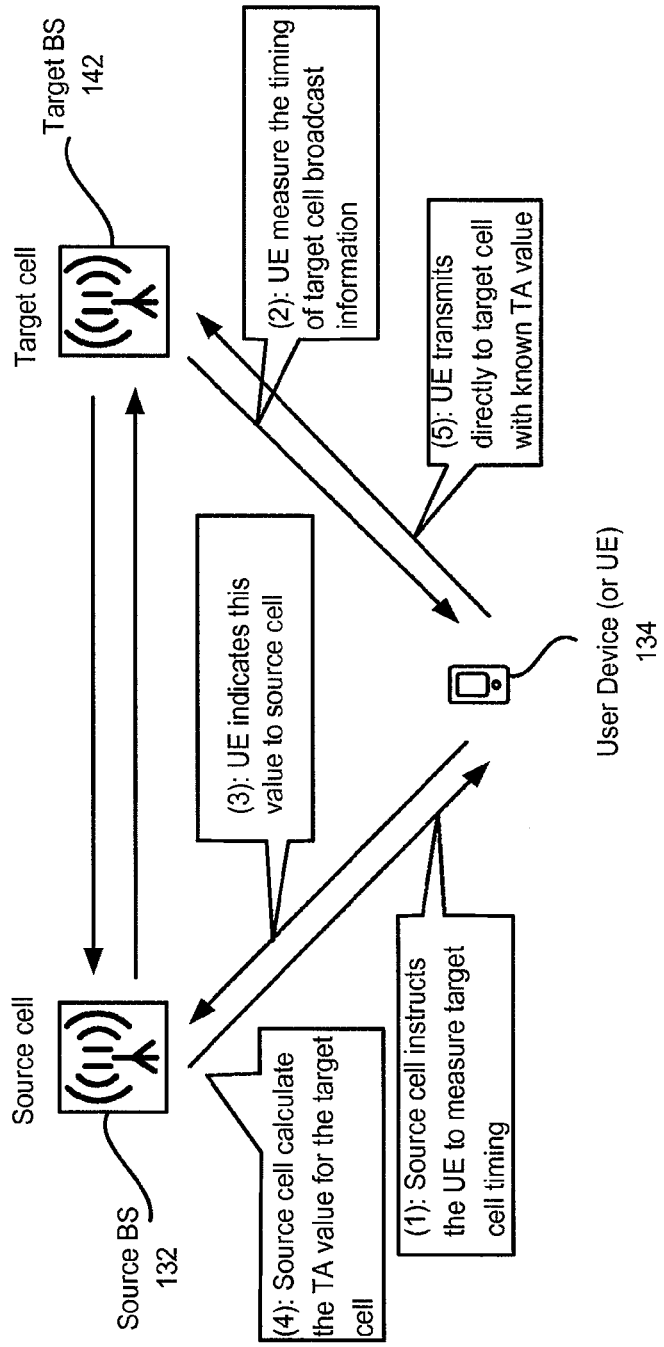
FIG. 7 is a diagram illustrating a third example implementation in which a source BS determines a time advance value for a user device with respect to a target BS.

FIG. 7 is a diagram illustrating a third example implementation in which a source BS determines a time advance value for a user device with respect to a target BS. This third example implementation (summarized in FIG. 7) is similar to the first example implementation, with at least one difference here including that the source BS/source cell determines a TA (e.g., TA2) for the target cell based on measurements reported from the user device/UE. At operation 1) in FIG. 7, the source cell/source BS 132 instructs the user device 134 or UE to measure target cell timing. For example, the source BS 132 may instruct the user device to measure the target BS propagation delay (e.g., T2) from the target BS 142 to the user device 134.

At operation 2 of FIG. 7, the user device 134 or UE may measure the target BS propagation delay, e.g., based on the delay of common reference signals (CRS) transmitted from the target BS 142. At operation 3) of FIG. 7, the user device 134 then sends this target BS propagation delay (e.g., T2) to the source cell/source BS 132. At operation 4) of FIG. 7, the source cell/source BS 142 determines a time advance value (e.g., TA2) for the user device with respect to the target BS (or for transmitting to the target BS 142). This time advance value (TA2) may be determined, for example, based on the time advance value (TA1) for the user device with respect to the source BS 132 and the target BS propagation delay. Also, the source cell/source BS 132 may send a handover command to the user device 134, including the time advance value (TA2) with respect to the target BS 142. At operation 5) of FIG. 7, the user device 134 transmits data, e.g., after handover, to the target cell/target BS 142 based on the time advance value The method or technique of FIG. 7 may be implemented according to the following, for example: determining, by a source base station (BS), a first time advance value for the user device to use in transmitting signals from the user device to source BS; sending, from the source BS to the user device a request to measure a target BS propagation delay of a signal transmitted from a target BS to the user device; receiving the target BS propagation delay from the user device; determining, by the source BS, a second time advance value for the user device to use in transmitting signals to the target BS; and, sending a handover command to the user device, the handover command including the second time advance value.

The method or technique of FIG. 7 may include one or more additional or different operations. According to an example implementation, the determining, by the source BS, the second time advance value for the user device may include determining, by the source BS based on the first time advance value and the target BS propagation delay, the second time advance value for the user device to use in transmitting signals to the target BS.

According to an example implementation, the determining, by the source BS, the second time advance value for the user device may include determining, by the source BS based on the following: TA2=TA1−2*(T2−T1), where T1 is a source BS propagation delay of a signal transmitted from the source BS to the user device, T2 is the target BS propagation delay, TA1 is the first time advance value for the user device, and TA2 is the second time advance value for the user device.

According to an example implementation, the technique of FIG. 7 may further include performing a synchronized and random access procedure-free handover of the user device from the source BS to the target BS based on the handover command, the handover of the user device being performed at a time identified in the handover command.

According to an example implementation, the technique of FIG. 7 may further include performing a handover of the user device from the source BS to the target BS, including: receiving, by the source BS from the user device, a measurement report indicating a handover to the target BS; and sending, by the source BS to the user device, a handover command including at least a handover time field that identifies a time to perform a random access procedure-free and synchronized handover to the target BS.

Figure 8:
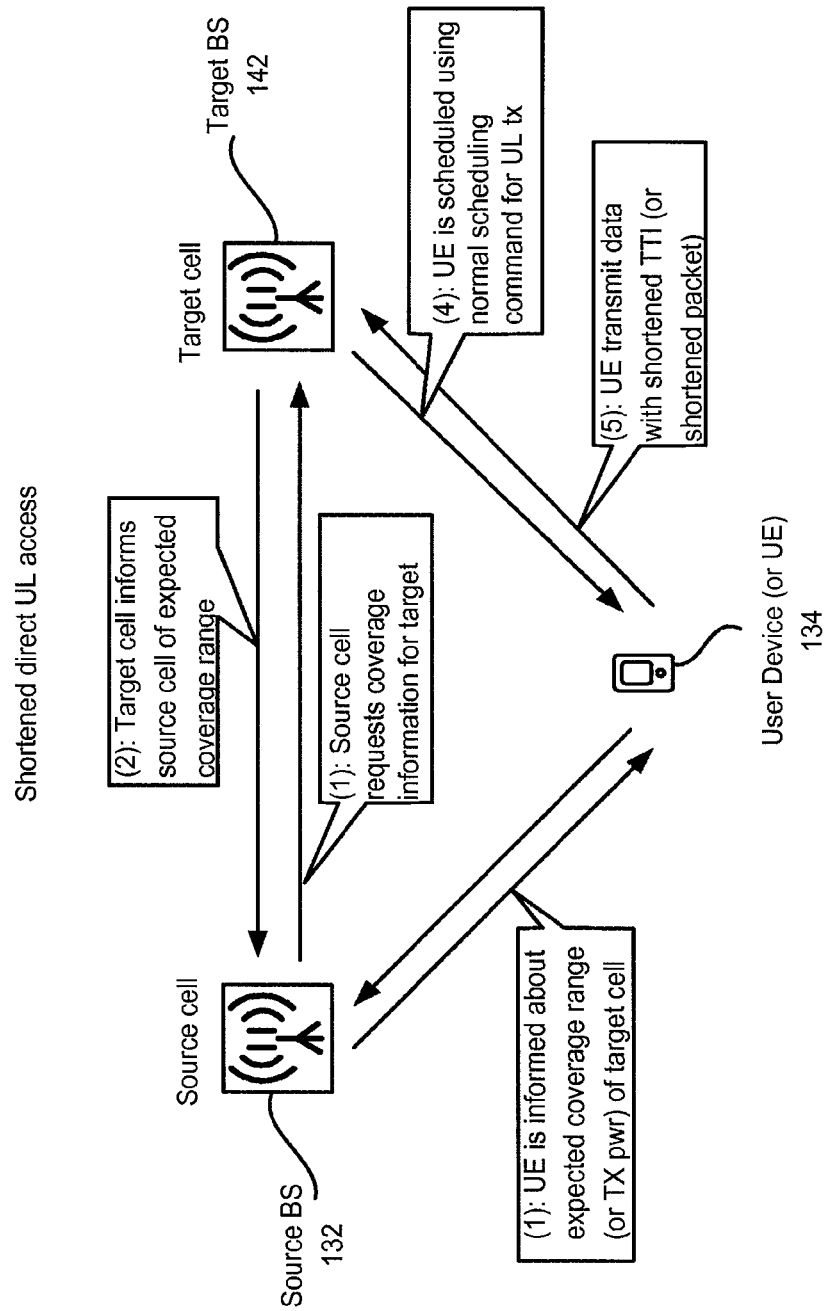
FIG. 8 is a diagram illustrating decreasing a size of a packet according to an example implementation.
Figure 9:
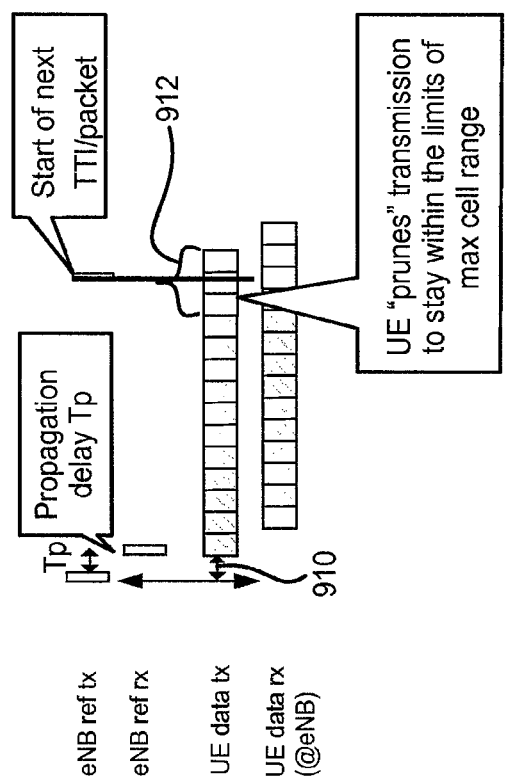
FIG. 9 is a diagram illustrating a decreasing of a size of a packet to avoid interference with an adjacent packet.

A fourth example implementation will be described with reference to FIGS. 8 and 9. FIG. 8 is a diagram illustrating decreasing a size of a packet to keep the packet within a boundary, such as within a packet or frame boundary. FIG. 9 is a diagram illustrating the decreasing of a size of a packet or TTI to avoid interference, e.g., to avoid interference with an adjacent TTI, packet, frame or other chunk of data. In an example implementation with respect to both FIGS. 8 and 9, it may be assumed that the user device does not yet have a time advance value for transmitting to the target BS. Therefore, as shown in FIG. 9, Tp is the propagation delay for the target BS 142 to the user device 134. In order to shorten or decrease a size of a packet for transmission, the user device 134 may delay the transmission at 910 by Tp, for example, or other time period. In addition, or in the alternative, to decrease a packet size, the user device 134 may prune or omit a portion of the packet or TTI at 912, e.g., by omitting (at 912) the transmission of one or more symbols at the beginning, middle or end of the packet.

According to an example implementation, the use device 134 may shorten its packet size an amount based on a coverage area (or expected coverage area) or a transmission power of the target BS 142. For example, more symbols of a packet may be omitted based on a larger coverage area or higher transmission power. In some cases, the transmission power of the target BS may define the coverage area or expected coverage area of the target BS, e.g., a higher transmission power will typically result in a greater coverage area. A larger coverage area may also mean a wider variation in time advance values for user devices or UEs within such cell or coverage area. By shortening a packet size based on target cell coverage area or transmission power, this technique may allow a user device to safely transmit data in an uplink direction to a target BS, even though the user device does not yet have the time advance value for transmitting to the target BS.

At operation 1) of FIG. 8, the source cell/source BS 132 sends to the target BS 142/target cell a request for an expected coverage range or transmission power for the target BS/target cell. At operation 2) of FIG. 8, the target BS 142 may send to the source BS 132 the expected coverage range or transmission power of the target BS 142/target cell. At operation 3) of FIG. 8, the source BS 132/source cell sends the expected coverage area or transmission power for the target BS/target cell to the user device 134 or UE. At operation 4) of FIG. 8, the target BS 142 sends a message to the user device scheduling UL resources for the user device to transmit to the target BS, even though in this example case, the user device may not have a time advance value with respect to the target BS 142. At operation 5) of FIG. 8, the user device 134 transmits data with a shortened TTI or shortened packet (e.g., based on coverage are or transmission power of target BS/cell) via scheduled UL resources. For example, one or more symbols may be omitted, at the beginning, middle or end (or any location) of a packet or TTI (transmission time interval). This technique may be used until user device 134 receives a time advance value from target BS. This technique may be combined with one or more other techniques described herein. Also, any of the techniques described herein may be combined.

The fourth example implementation may be implemented, for example, according to the following: sending, from a source base station (BS) to a target BS, a request for expected coverage range or transmission power level for a cell associated with the target BS; receiving, by the source BS from the target BS, the expected coverage range or transmission power level of the cell associated with the target BS; sending the expected coverage range or transmission power level of the cell associated with the target BS from the source BS to a user device; sending a handover command to the user device to cause a handover for the user device from the source BS to the target BS, wherein the user device omits one or more symbols from the transmitted data packet. The transmitted data packet may be confined to one or more transmit time intervals (TTIs) transmitted by the user device to the target BS based on the expected coverage range or transmission power level of the target BS.

According to an example implementation, the user device omitting may include the user device omitting a first number of symbols of one or more packets if the expected coverage range or transmission power is above a first threshold and less than a second threshold, and the user device omitting a second number of symbols of one or more packets if the expected cover range or transmission power is greater than the second threshold, wherein the second number is greater than the first number.

According to an example implementation, the user device omitting may include the user device omitting three symbols of one or more packets if the expected coverage range or transmission power indicates a macro cell or large cell; omitting two symbols of one or more packets if the expected coverage range or transmission power indicates a micro cell or medium cell, where the micro cell is smaller than the macro cell; and, omitting one symbol of one or more packets if the expected coverage range or transmission power indicates a pico cell or small cell, where the pico cell is smaller than the micro cell.

Figure 10:
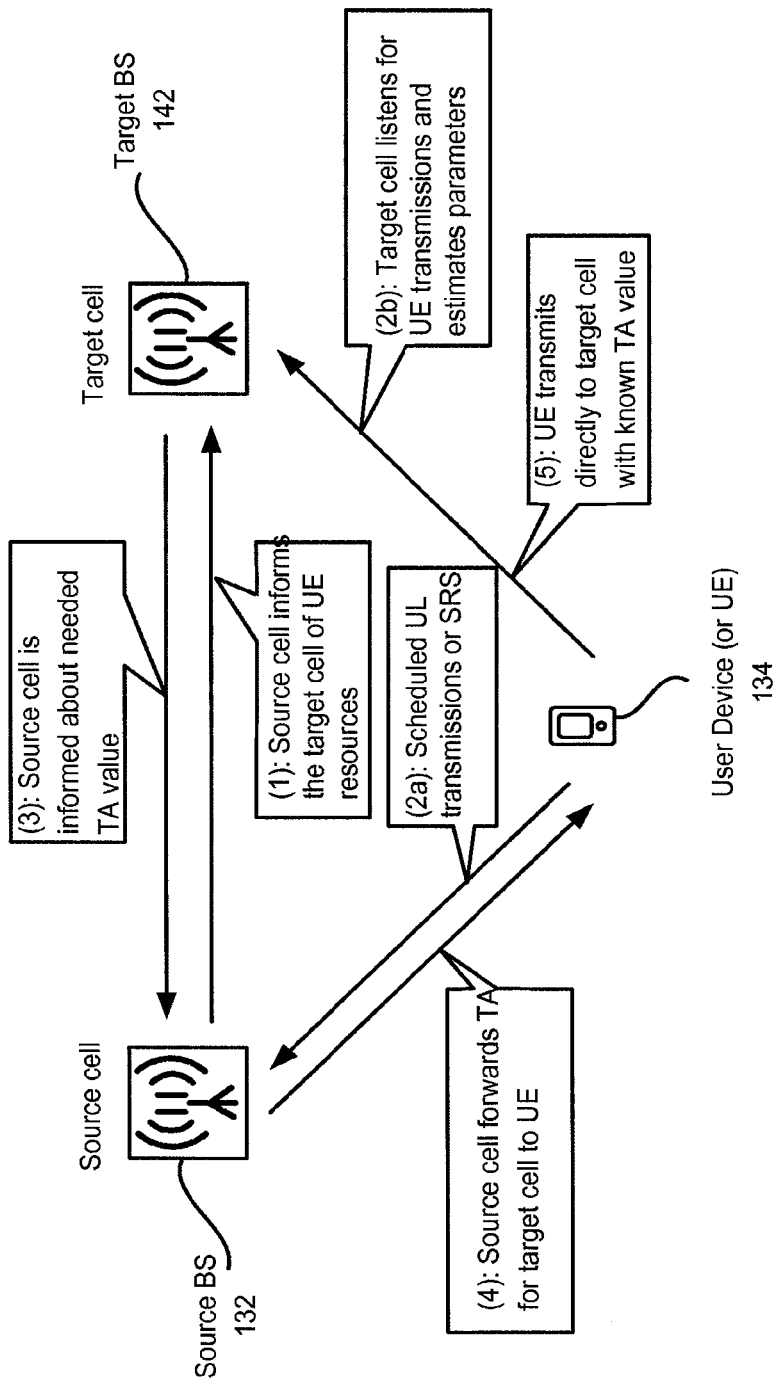
FIG. 10 is a diagram illustrating a fifth example implementation in which a target BS estimates a time advance value for a user device with respect to the target BS, and then forwards the time advance value to the source BS for forwarding to the user device.

FIG. 10 is a diagram illustrating a fifth example implementation in which a target BS estimates a time advance value for a user device with respect to the target BS, and then forwards the time advance value to the source BS for forwarding to the user device. This fifth example implementation is very similar to the second example implementation, except in the fifth example implementation, the target BS sends the determined time advance value (TA2) to the source BS for forwarding to the user device via a handover command.

According to a fifth example implementation illustrated in FIG. 10, an alternative passive scheme is provided where: At operation 1, the source cell/source BS 132 informs the target cell/target BS 142 about the configuration of the handover candidate (e.g., configuration of the user device 134), such as the information identifying the user device 134 (e.g., MSID or C-RNTI), source cell ID or source BS ID, SRS (sounding reference signal) configuration that identifies a configuration of the SRS signals transmitted by the user device 134, a current time advance value (e.g., TA1) used by the user device 134 when transmitting to the source BS 132, and potentially also scheduling information (e.g., uplink resources scheduled by source BS 132 to allow the user device 134 to transmit data or SRS signals to the source BS 132). At operation 2A of FIG. 10, the user device 134 may transmit signals (e.g., SRS signals) via the scheduled resources. By knowing this information, at operation 2B, at the target cell; target BS 142 is able to receive and measure the uplink (UL) signals (e.g., SAS signals) transmitted from the user device 134/UE at operation 2A in FIG. 10, and hence the target BS 142 can estimate a timing advance (TA2) for the user device with respect to the target cell/target BS 142. Following, at operation 3) of FIG. 10, the target BS 142 sends the time advance value (TA2) for the target BS 142 to the source BS 132. At operation 4) of FIG. 10, the source BS 132 informs the user device 134 of the time advance value (TA2). For example, the target cell/target BS 142 may send the time advance value (TA2) for the target BS 142 to the user device 134/UE in one of the first downlink (DL) transmissions after the user device starts to listen (e.g., receive and decode) to signals from the target cell/target BS 142. For example, the time advance value (e.g., TA2) with respect to the target BS 142 may be sent by target BS 142 to user device 134 via a scheduling grant sent to the user device 134. At operation 5) of FIG. 10, the user device 134 may transmit data to the target BS 142 based (e.g., by advancing the start of transmission by TA2) on the time advance value (TA2).

According to an example implementation, a target BS may determine a time advance value for a user device with respect to the target BS based on the following: receiving, by a target base station (BS) from a source BS, information identifying a user device that is connected to the source BS, information identifying a source cell or the source BS, and a first time advance value used by the user device to transmit signals to the source BS; receiving a signal by the target BS that was transmitted from the user device based on the first time advance value; determining, by the target BS based upon the first time advance value and the received signal from the user device, a second time advance value to be used by the user device to transmit data to the target BS; sending the second time advance value from the target BS to the source BS; receiving, by the target BS, a handover of the user device from the source BS to the target BS; and receiving data by the target BS from the user device based on the second time advance value.

In an example implementation, the source BS sends the second time advance value to the user device.

The fifth implementation may further include the source BS sending a handover command to the user device, the handover command identifying a synchronized and random access procedure-free handover to the target BS, a time to perform the handover, and the second time advance value.

The fifth implementation may further include receiving by the target BS from the source BS a handover request to perform a handover of the user device from the source BS to the target BS, the handover request including a handover time that identifies a time when a synchronized handover for the user device is to be performed from the source BS to the target BS; and sending, by the target BS to the source BS, a handover request acknowledgement that acknowledges that a synchronized handover will be performed for the user device from the source BS to the target BS at the identified time.

The fifth implementation may further include receiving, by the target BS from the source BS, a signal configuration information identifying a configuration of a reference signal transmitted by the user device to the source ES using the first time advance value; receiving, by the target BS from the source BS, scheduling information identifying scheduled resources for the user device to transmit the reference signal to the source BS; wherein the receiving a signal by the target BS from the user device includes the target BS receiving the scheduled reference signal from the user device.

In an example implementation, the determining may include determining, by the target BS, a second time advance value to be used by the user device to transmit data to the target BS based upon the first time advance value and the reference signal received from the user device via the scheduled resources.

In an example implementation, the receiving a handover may include receiving a synchronized and random access-free handover of the user device from the source BS to the target BS, the synchronized handover being performed at a time identified by a handover command.

Figure 11:
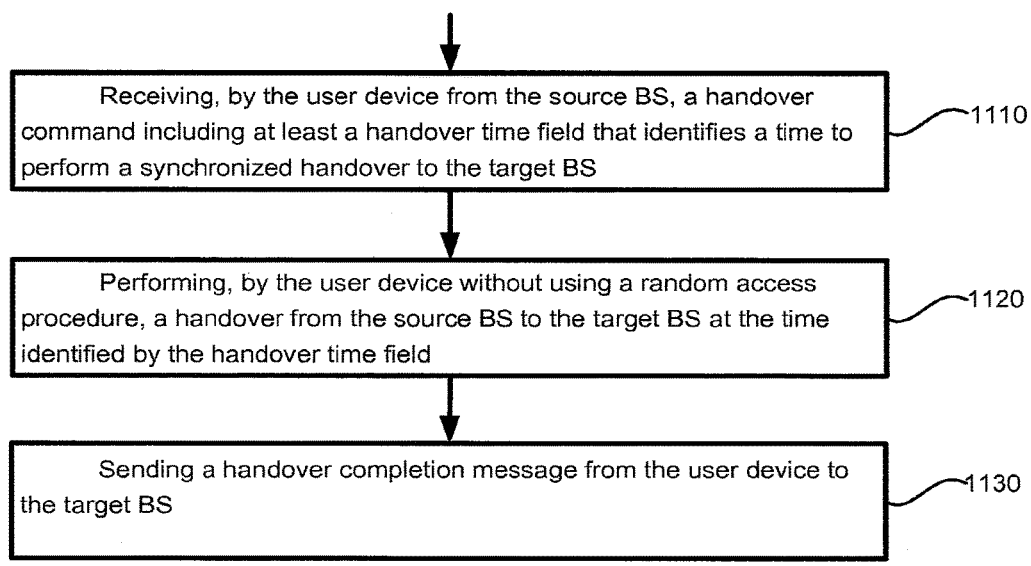
FIG. 11 is a flow chart illustrating operation of a user device according to an example implementation.

FIG. 11 is a flow chart illustrating operation of a user device according to an example implementation. Operation 1110 includes receiving, by the user device from the source BS, a handover command including at least a handover time field that identifies a time to perform a synchronized handover to the target BS. Operation 1120 includes performing, by the user device without using a random access procedure, a handover from the source BS to the target BS at the time identified by the handover time field. And, operation 1130 includes ending a handover completion message from the user device to the target BS.

Figure 12:
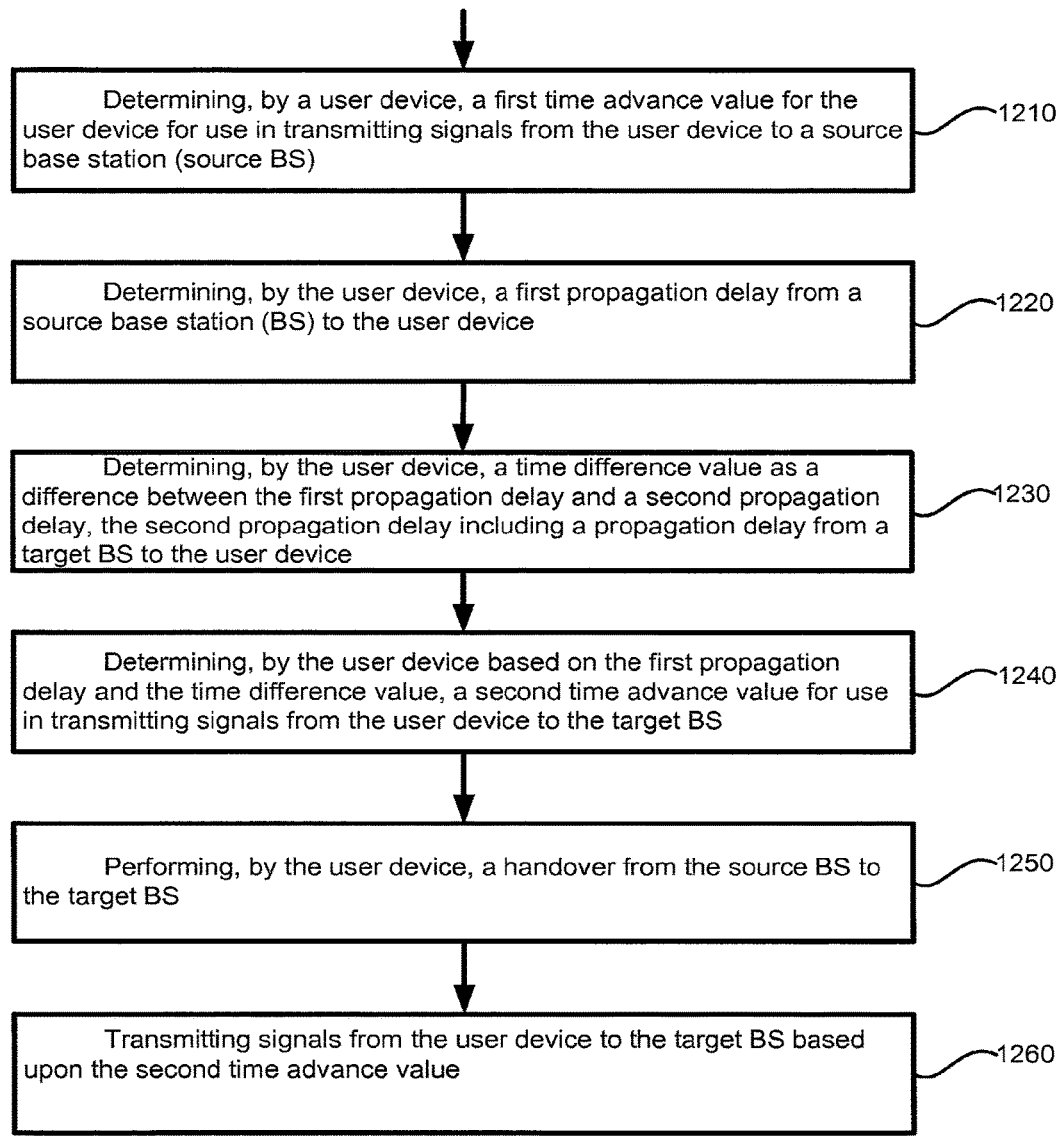
FIG. 12 is a flow chart illustrating operation of a user device according to another example implementation.

FIG. 12 is a flow chart illustrating operation of a user device according to another example implementation. Operation 1210 includes determining, by a user device, a first time advance value for the user device for use in transmitting signals from the user device to a source base station (source BS). Operation 1220 includes determining, by the user device, a first propagation delay from a source base station (BS) to the user device. Operation 1230 includes determining, by the user device, a time difference value as a difference between the first propagation delay and a second propagation delay, the second propagation delay including a propagation delay from a target BS to the user device. Operation 1240 includes determining, by the user device based on the first propagation delay and the time difference value, a second time advance value for use in transmitting signals from the user device to the target BS. Operation 1250 includes performing, by the user device, a handover from the source BS to the target BS. Operation 1260 includes transmitting signals from the user device to the target BS based upon the second time advance value.

Figure 13:
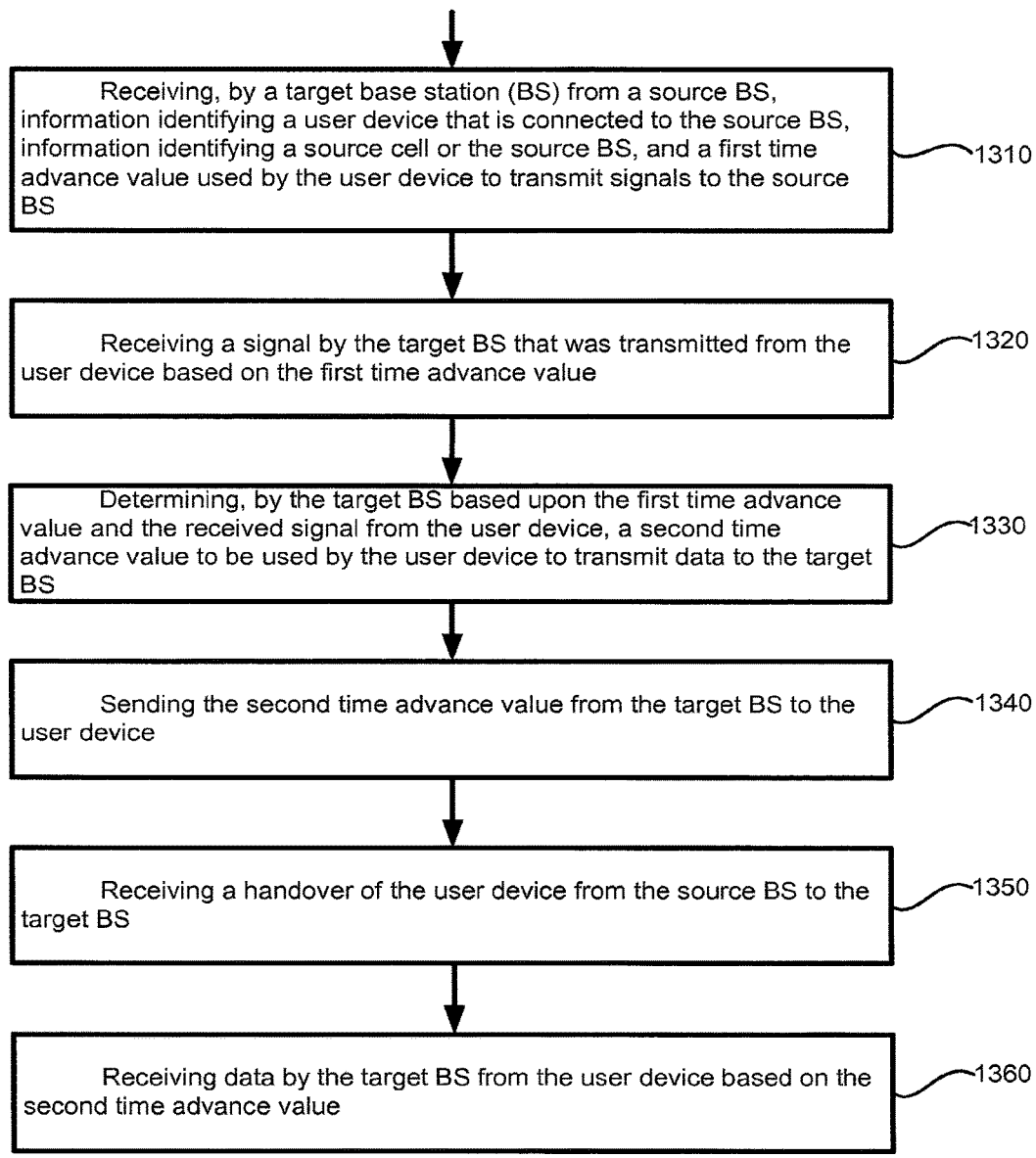
FIG. 13 is a flow chart illustrating operation of a target base station according to an example implementation.

FIG. 13 is a flow chart illustrating operation of a target base station according to an example implementation. Operation 1310 includes receiving, by a target base station (BS) from a source BS, information identifying a user device that is connected to the source BS, information identifying a source cell or the source BS, and a first time advance value used by the user device to transmit signals to the source BS. Operation 1320 includes receiving a signal by the target BS that was transmitted from the user device based on the first time advance value. Operation 1330 includes determining, by the target BS based upon the first time advance value and the received signal from the user device, a second Lime advance value to be used by the user device to transmit data to the target BS. Operation 1340 includes sending the second time advance value from the target BS to the user device. Operation 1350 includes receiving a handover of the user device from the source BS to the target BS. And, operation 1360 includes receiving data by the target BS from the user device based on the second time advance value.

Figure 14:
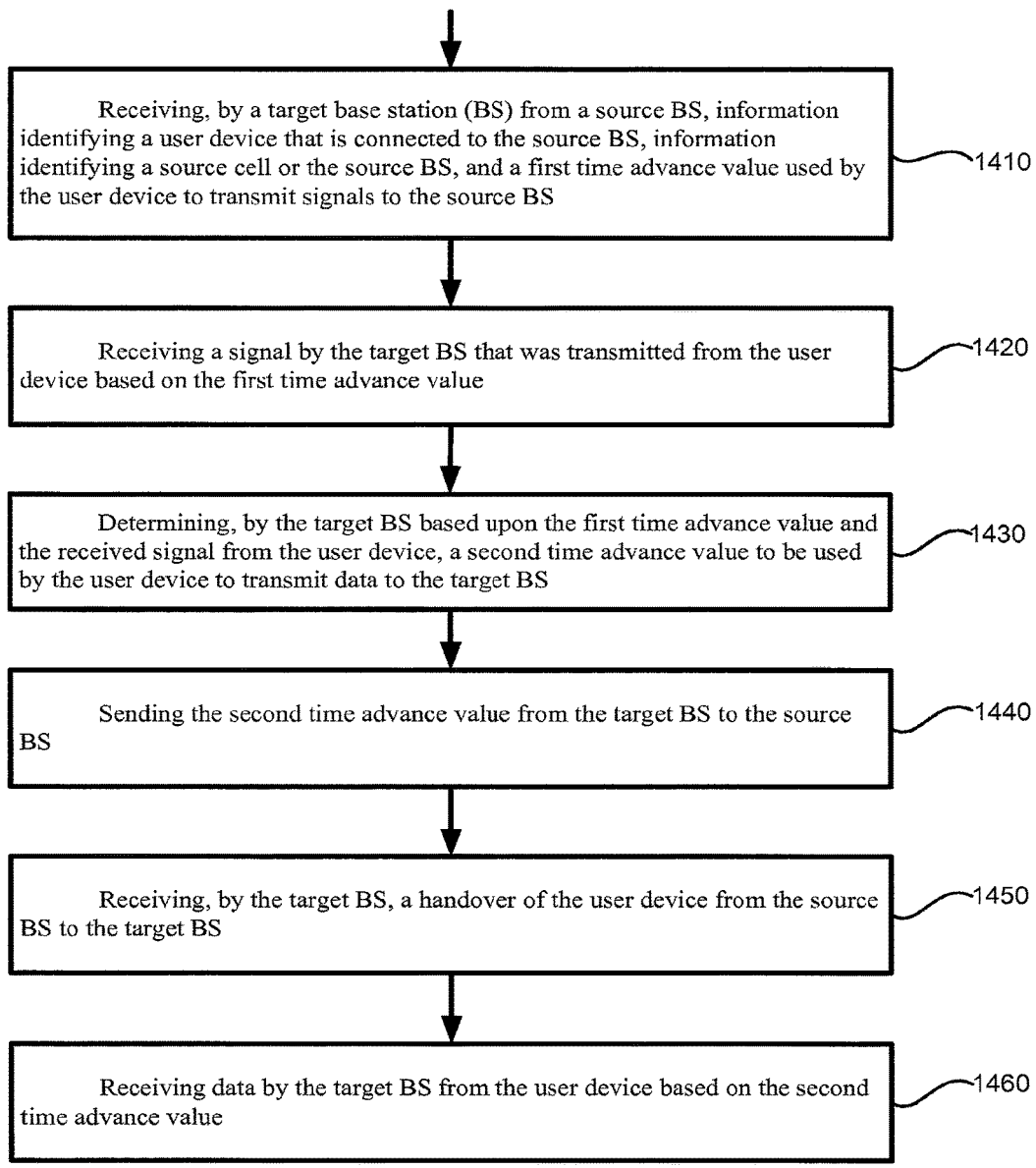
FIG. 14 is a flow chart illustrating operation of a target base station according to another example implementation.

FIG. 14 is a flow chart illustrating operation of a target base station according to another example implementation. Operation 1410 includes receiving, by a target base station (BS) from a source BS, information identifying a user device that is connected to the source BS, information identifying a source cell or the source BS, and a first time advance value used by the user device to transmit signals to the source BS. Operation 1420 includes receiving a signal by the target BS that was transmitted from the user device based on the first time advance value. Operation 1430 includes determining, by the target BS based upon the first time advance value and the received signal from the user device, a second time advance value to be used by the user device to transmit data to the target BS. Operation 1440 includes sending the second time advance value from the target BS to the source BS. Operation 1450 includes receiving, by the target BS, a handover of the user device from the source BS to the target BS. Operation 1460 includes receiving data by the target BS from the user device based on the second time advance value.

Figure 15:
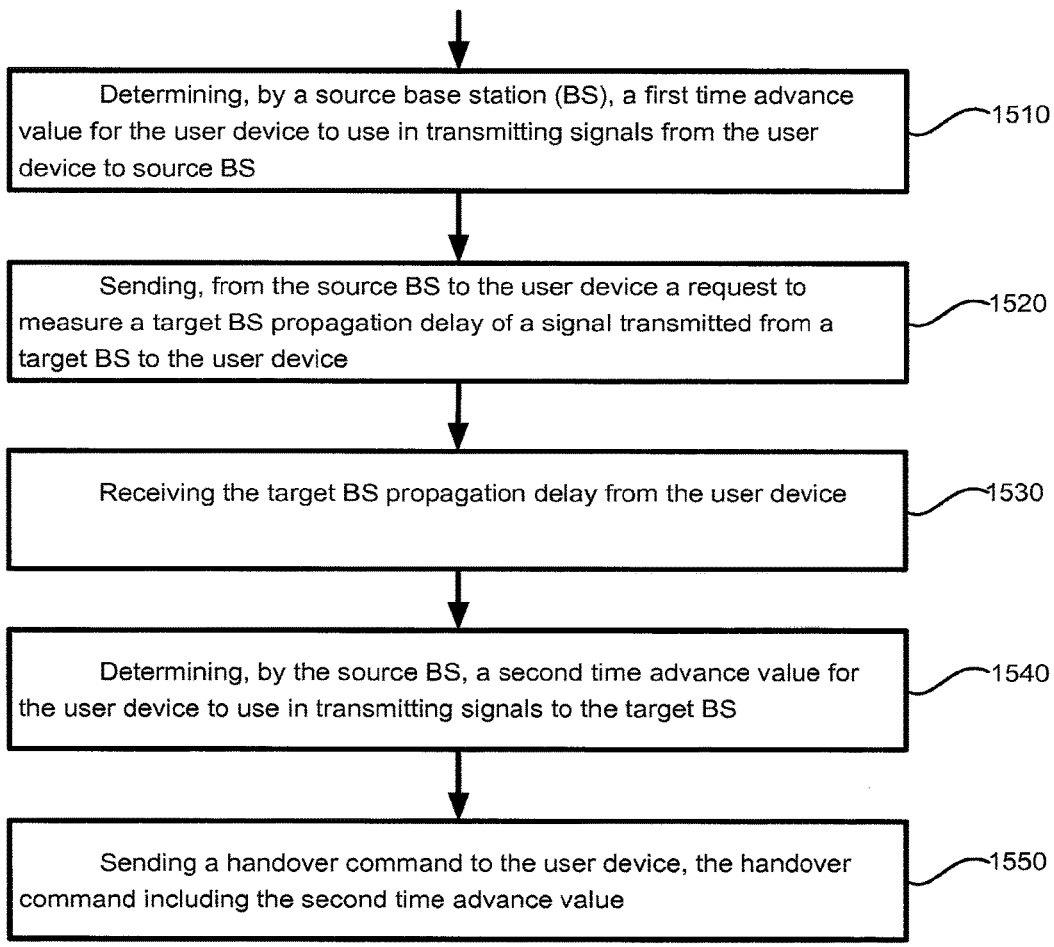
FIG. 15 is a flow chart illustrating operation of a source base station according to an example implementation.

FIG. 15 is a flow chart illustrating operation of a source base station according to an example implementation. Operation 1510 may include determining, by a source base station (BS), a first time advance value for the user device to use in transmitting signals from the user device to source BS. Operation 1520 includes sending, from the source BS to the user device a request to measure a target BS propagation delay of a signal transmitted from a target BS to the user device. Operation 1530 includes receiving the target BS propagation delay from the user device. Operation 1540 includes determining, by the source BS, a second time advance value for the user device to use in transmitting signals to the target BS. Operation 1550 includes sending a handover command to the user device, the handover command including the second time advance value.

Figure 16:
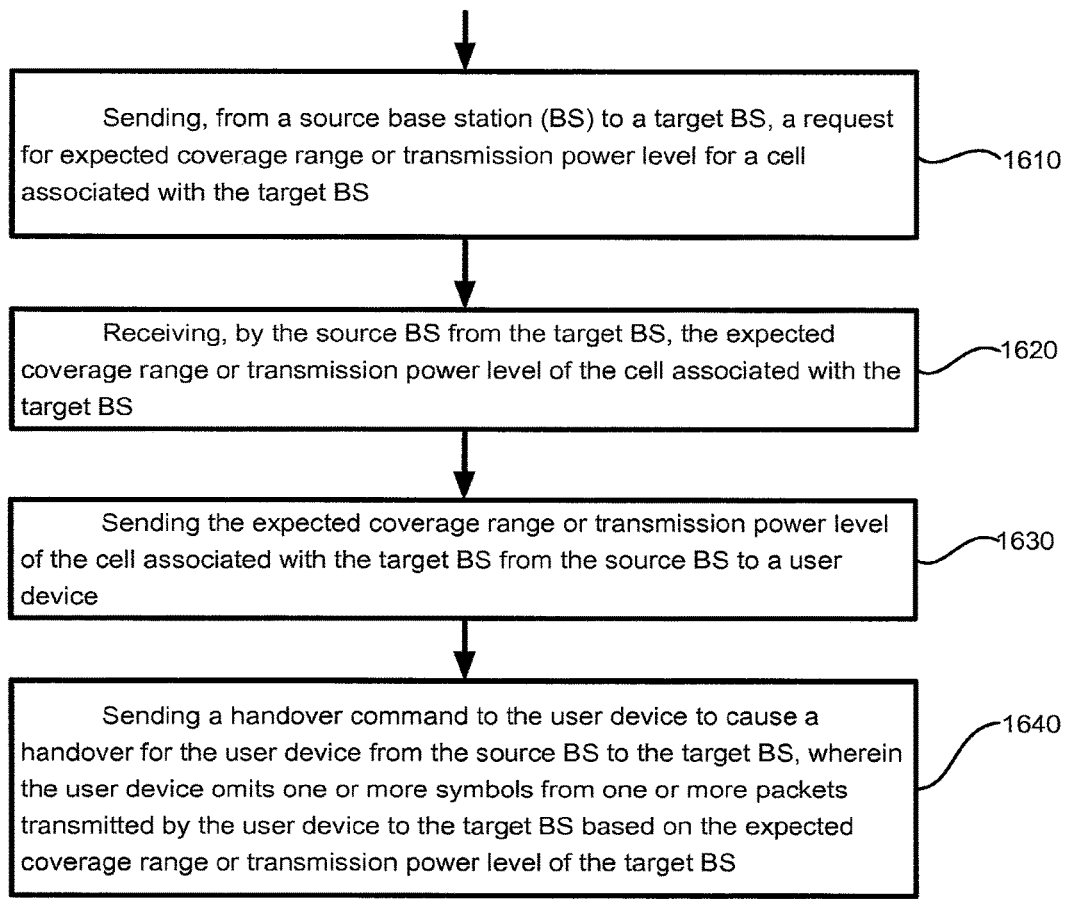
FIG. 16 is a flow chart illustrating operation of a source base station according to an example implementation.

FIG. 16 is a flow chart illustrating operation of a source base station according to an example implementation. Operation 1610 includes sending, from a source base station (BS) to a target BS, a request for expected coverage range or transmission power level for a cell associated with the target BS. Operation 1620 includes receiving, by the source BS from the target BS, the expected coverage range or transmission power level of the cell associated with the target BS. Operation 1630 includes sending the expected coverage range or transmission power level of the cell associated with the target BS from the source BS to a user device. Operation 1640 includes sending a handover command to the user device to cause a handover for the user device from the source BS to the target BS, wherein the user device omits one or more symbols from one or more packets transmitted by the user device to the target BS based on the expected coverage range or transmission power level of the target BS.

Figure 17:
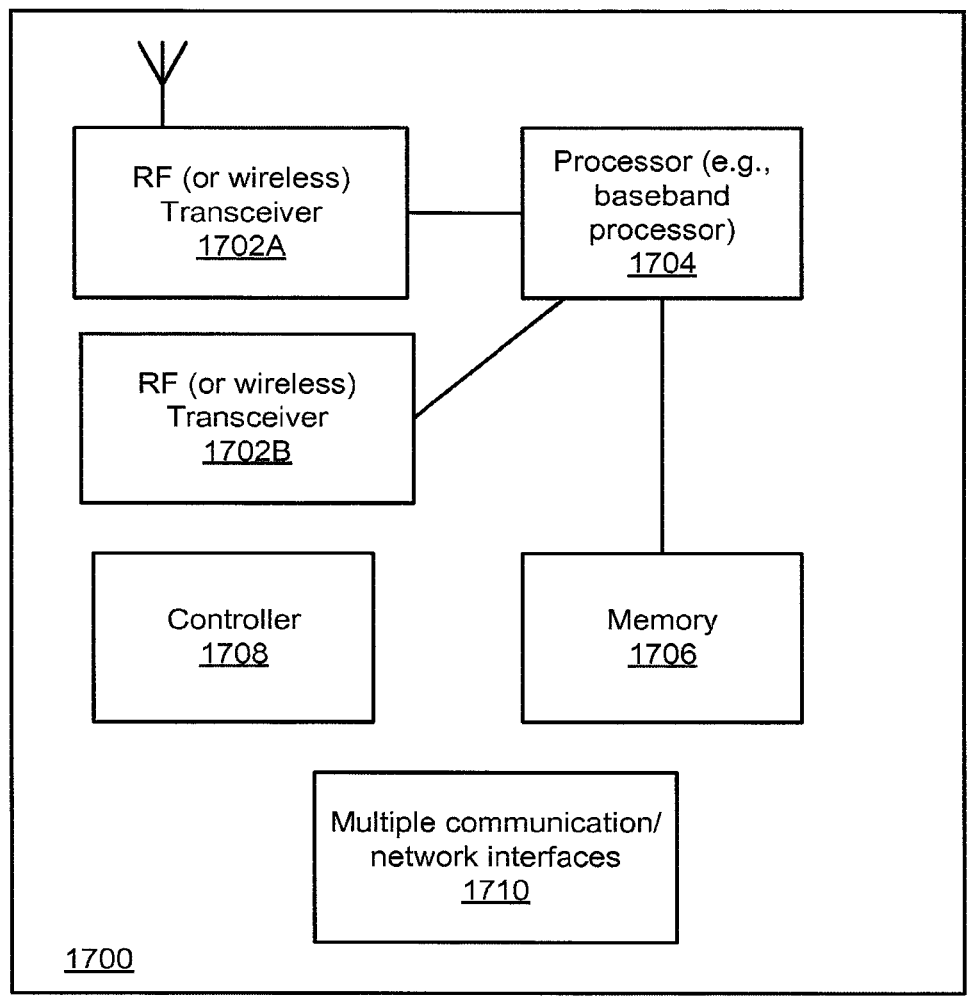
FIG. 17 is a block diagram of a wireless station (e.g., a BS or a user device, or other communications device) 1700 according to an example implementation.

FIG. 17 is a block diagram of a wireless station (e.g., a BS or a user device, or other communications device) 1700 according to an example implementation. The wireless station 1700 may include, for example, two RF (radio frequency) or wireless transceivers 1702A, 1702B, where each wireless transceiver includes a transmitter to transmit signals and a receiver to receive signals. An antenna may be provided for each wireless transceiver. The wireless station also includes a processor 1704 to execute instructions or software and control transmission and receptions of signals, and a memory 1706 to store data and/or instructions.

Also, multiple communications or network interfaces 1710 are provided to allow the wireless station 1700 to communicate via different communications media. Processor 1704 may also make decisions or determinations, generate frames, packets or messages for transmission, decode received frames or messages for further processing, and other tasks or functions described herein. Processor 1704, which may be a baseband processor, for example, may generate messages, packets, frames or other signals for transmission via wireless transceiver 1702. Processor 1704 may control transmission of signals or messages over a wireless network, and may receive signals or messages, etc., via a wireless network (e.g., after being down-converted by wireless transceiver 1702, for example). Processor 1704 may be programmable and capable of executing software or other instructions stored in memory or on other computer media to perform e various tasks and functions described above, such as one or more of the tasks or methods described above. Processor 1704 may be (or may include), for example, hardware, programmable logic, a programmable processor that executes software or firmware, and/or any combination of these. Using other terminology, processor 1704 and transceiver 1702 together may be considered as a wireless transmitter/receiver system, for example.

In addition, referring to FIG. 17, a controller (or processor) 1708 may execute software and instructions, and may provide overall control for the station 1700, and may provide control for other systems not shown in FIG. 17, such as controlling input/output devices (e.g., display, keypad), and/or may execute software for one or more applications that may be provided on wireless station 1700, such as, for example, an email program, audio/video applications, a word processor, a Voice over IP application, or other application or software.

In addition, a storage medium may be provided that includes stored instructions, which when executed by a controller or processor may result in the processor 1704, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices, magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising at least one processor and at least one memory including computer instructions, when executed by the at least one processor, cause the apparatus to:

receive, by a target base station (target BS) from a source base station (source BS), information identifying a user device that is connected to the source BS, information identifying a source cell or the source BS, and a first time advance value used by the user device to transmit signals to the source BS;

receive a signal by the target BS that was transmitted from the user device based on the first time advance value;

determine, by the target BS based upon the first time advance value and the received signal from the user device, a second time advance value to be used by the user device to transmit data to the target BS;

send the second time advance value from the target BS to the user device;

receive a handover of the user device from the source BS to the target BS; and receive data by the target BS from the user device based on the second time advance value.

2. The apparatus of claim 1, wherein the at least one memory and the computer program code are further configured to, with the at least one processor, cause the apparatus to
receive by the target BS from the source BS a handover request to perform a handover of the user device from the source BS to the target BS, the handover request including a handover time that identifies a time when a synchronized handover for the user device is to be performed from the source BS to the target BS.

3. The apparatus of claim 1, wherein the at least one memory and the computer program code are further configured to, with the at least one processor, cause the apparatus to:
receive, by the target BS from the source BS, a signal configuration information identifying a configuration of a reference signal transmitted by the user device to the source BS using the first time advance value;
receive, by the target BS from the source BS, scheduling information identifying scheduled resources for the user device to transmit the reference signal to the source BS;
wherein the receiving a signal by the target BS from the user device includes the target BS receiving the scheduled reference signal from the user device.

4. The apparatus of claim 3 wherein the at least one memory and the computer program code are further configured to, with the at least one processor, cause the apparatus to
determine, by the target BS, a second time advance value to be used by the user device to transmit data to the target BS based upon the first time advance value and the reference signal received from the user device via the scheduled resources.

5. The apparatus of claim 3, wherein the reference signal comprises a sounding reference signal.

6. The apparatus of claim 1, wherein the receiving the handover comprises receiving a synchronized and random access-free handover of the user device from the source BS to the target BS in response, the synchronized handover being performed at a time identified by a handover command.

7. A method, comprising:
receiving, by a target base station (target BS) from a source base station (source BS), information identifying a user device that is connected to the source BS, information identifying a source cell or the source BS, and a first time advance value used by the user device to transmit signals to the source BS;
receiving a signal by the target BS that was transmitted from the user device based on the first time advance value;
determining, by the target BS based upon the first time advance value and the received signal from the user device, a second time advance value to be used by the user device to transmit data to the target BS;
sending the second time advance value from the target BS to the user device;
receiving a handover of the user device from the source BS to the target BS; and
receiving data by the target BS from the user device based on the second time advance value.

8. The method of claim 7, further comprising:
receiving by the target BS from the source BS a handover request to perform a handover of the user device from the source BS to the target BS, the handover request including a handover time that identifies a time when a synchronized handover for the user device is to be performed from the source BS to the target BS.

9. The method of claim 7, further comprising:
receiving, by the target BS from the source BS, a signal configuration information identifying a configuration of a reference signal transmitted by the user device to the source BS using the first time advance value;
receiving, by the target BS from the source BS, scheduling information identifying scheduled resources for the user device to transmit the reference signal to the source BS;
wherein the receiving a signal by the target BS from the user device includes the target BS receiving the scheduled reference signal from the user device.

10. The method of claim 9, further comprising:
determining, by the target BS, a second time advance value to be used by the user device to transmit data to the target BS based upon the first time advance value and the reference signal received from the user device via the scheduled resources.

11. The method of claim 9, wherein the reference signal comprises a sounding reference signal.

12. The method of claim 7, wherein receiving the handover comprises receiving a synchronized and random access-free handover of the user device from the source BS to the target BS, the synchronized handover being performed at a time identified by a handover command.

* * * * *